US011026007B2

(12) United States Patent
Noh et al.

(10) Patent No.: US 11,026,007 B2
(45) Date of Patent: Jun. 1, 2021

(54) DISPLAY DEVICE

(71) Applicant: Samsung Display Co. Ltd., Yongin-si (KR)

(72) Inventors: Jung Hun Noh, Yongin-si (KR); Yi Joon Ahn, Seoul (KR); Rang Kyun Mok, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/443,874

(22) Filed: Jun. 18, 2019

(65) Prior Publication Data

US 2020/0077169 A1 Mar. 5, 2020

(30) Foreign Application Priority Data

Sep. 5, 2018 (KR) .................. 10-2018-0105789

(51) Int. Cl.
*H04R 1/02* (2006.01)
*G06F 3/01* (2006.01)
(Continued)

(52) U.S. Cl.
CPC ............. *H04R 1/028* (2013.01); *G06F 3/016* (2013.01); *H04M 1/03* (2013.01); *H04M 1/72454* (2021.01); *H04R 5/02* (2013.01); *H04M 2201/38* (2013.01); *H04R 2400/03* (2013.01); *H04R 2499/15* (2013.01)

(58) Field of Classification Search
CPC ...... G06F 3/016; G06F 1/1626; G06F 1/1637; H04M 1/03; H04M 1/72569; H04M 2201/38; H04R 1/028; H04R 2400/03; H04R 2499/15; H04R 5/02; H04R 17/00; H04R 7/045; H04R 2499/11; (Continued)

(56) References Cited

U.S. PATENT DOCUMENTS 7,382,890 B2   6/2008 Saiki et al.
8,723,824 B2 * 5/2014 Myers .................. G06F 3/0485
345/173
(Continued)

FOREIGN PATENT DOCUMENTS

EP    1507438      2/2005
EP    2947857 A2 * 11/2015 ............. H04R 1/028
(Continued)

OTHER PUBLICATIONS

Extended European Search Report dated Oct. 18, 2019, in European Patent Application No. 19194256.4.

*Primary Examiner* — Matthew C Sams
(74) *Attorney, Agent, or Firm* — H.C. Park & Associates, PLC

(57) ABSTRACT

A display device including: a display panel configured to display an image on a first surface thereof; a first sound generating device configured to provide a first sound; and a second sound generating device configured to provide a second sound, wherein the first sound generating device is attached to a second surface of the display panel, the second surface being opposite to the first surface, and wherein the first sound generating device is a vibration generating device configured to vibrate the display panel in accordance with a first sound signal to generate the first sound.

23 Claims, 30 Drawing Sheets

(51) Int. Cl.
*H04M 1/03* (2006.01)
*H04R 5/02* (2006.01)
*H04M 1/72454* (2021.01)

(58) Field of Classification Search
CPC .. H04R 2440/05; G10K 9/122; B06B 1/0622; B06B 1/0607; H04N 5/642; H05K 5/0017
See application file for complete search history.

(56) References Cited

U.S. PATENT DOCUMENTS

| | | | | |
|---|---|---|---|---|
| 8,879,766 | B1* | 11/2014 | Zhang | H04R 1/028 |
| | | | | 381/333 |
| 9,843,866 | B2* | 12/2017 | Yan | H04M 1/03 |
| 10,200,772 | B2* | 2/2019 | Ahn | H04M 1/03 |
| 10,547,950 | B2* | 1/2020 | Xiang | G10K 9/125 |
| 2007/0202917 | A1 | 8/2007 | Phelps et al. | |
| 2010/0225600 | A1 | 9/2010 | Dai et al. | |
| 2012/0243719 | A1* | 9/2012 | Franklin | H04R 1/02 |
| | | | | 381/333 |
| 2015/0009425 | A1 | 1/2015 | Kwon et al. | |
| 2015/0341714 | A1* | 11/2015 | Ahn | H04M 1/03 |
| | | | | 381/333 |
| 2015/0373441 | A1 | 12/2015 | Behles et al. | |
| 2016/0014247 | A1 | 1/2016 | Behles et al. | |
| 2016/0150323 | A1* | 5/2016 | Yan | H04M 1/03 |
| | | | | 381/123 |
| 2017/0105294 | A1 | 4/2017 | Shimoda et al. | |
| 2017/0280216 | A1* | 9/2017 | Lee | H04R 3/14 |
| 2017/0280234 | A1 | 9/2017 | Choi et al. | |
| 2019/0250752 | A1* | 8/2019 | Shim | G06F 1/1637 |
| 2020/0059733 | A1* | 2/2020 | Shin | H04R 17/00 |
| 2020/0280807 | A1* | 9/2020 | Kim | H05K 5/0017 |
| 2020/0293737 | A1* | 9/2020 | Kim | G06K 9/0002 |
| 2020/0374634 | A1* | 11/2020 | Ohashi | H01L 51/0097 |

FOREIGN PATENT DOCUMENTS

| | | | |
|---|---|---|---|
| EP | 3330780 | 6/2018 | |
| EP | 3499854 A1 * | 6/2019 | ............ G10K 9/122 |
| KR | 10-2016-0080048 | 7/2016 | |
| KR | 10-1684141 | 12/2016 | |
| KR | 10-2018-0004427 | 1/2018 | |
| WO | 2013134621 | 9/2013 | |
| WO | WO-2018110962 A1 * | 6/2018 | ........... G06F 3/0412 |
| WO | WO-2018143529 A1 * | 8/2018 | ............. G06F 3/016 |

* cited by examiner

DISPLAY DEVICE

CROSS REFERENCE TO RELATED APPLICATION

This application claims priority from and the benefit of Korean Patent Application No. 10-2018-0105789, filed on Sep. 5, 2018, which is hereby incorporated by reference for all purposes as if fully set forth herein.

BACKGROUND

Field

Exemplary embodiments/implementations of the invention relate generally to a display device.

Discussion of the Background

As the information society develops, the demand for display devices for displaying images has increased and diversified. For example, display devices have been applied to a variety of electronic devices such as smart phones, digital cameras, notebook computers, navigation devices, and smart televisions (TVs). A display device includes a display panel for displaying images and a sound generating device for providing sound.

As display devices are increasingly applied to various electronic devices, display devices having various designs are required. For example, for a smart phone, a display device capable of widening a display area by eliminating a sound generating device, which is for outputting the voice of the other party during a call, from the front surface thereof is required.

The above information disclosed in this Background section is only for understanding of the background of the inventive concepts, and, therefore, it may contain information that does not constitute prior art.

SUMMARY

Devices constructed according to exemplary implementations of the invention provide a display device including one or more sound generating devices that are not exposed to the outside.

Additional features of the inventive concepts will be set forth in the description which follows, and in part will be apparent from the description, or may be learned by practice of the inventive concepts.

According to one or more embodiments of the invention, a display device includes: a display panel configured to display an image on a first surface thereof; a first sound generating device configured to provide a first sound; and a second sound generating device configured to provide a second sound, wherein the first sound generating device is attached to a second surface of the display panel, the second surface being opposite to the first surface, and wherein the first sound generating device is a vibration generating device configured to vibrate the display panel in accordance with a first sound signal to generate the first sound.

A sound pressure level of the first sound in a high frequency band may be higher than a sound pressure level of the second sound in the high frequency band, and the sound pressure level of the second sound in a low frequency band may be higher that the sound pressure level of the first sound in the low frequency band.

The second sound generating device may be configured to provide the second sound in accordance with a second sound signal.

The display device may further include: a third sound generating device configured to provide a third sound in accordance with a third sound signal.

A sound pressure level of the first sound in a high frequency band may be higher than a sound pressure level of the third sound in the high frequency band, and the sound pressure level of the third sound in a low frequency band may be higher than the sound pressure level of the first sound in the low frequency band.

The second and third sound generating devices may be disposed on a circuit board disposed on the second surface of the display panel.

The second sound generating device may be disposed on one side of the circuit board, and the third sound generating device may be disposed on the other side of the circuit board.

The first sound generating device may be configured to provide the first sound in response to the display device being driven in a call mode, at least two of the first, second, and third sound generating devices may be configured to provide sound in response to the display device being driven in a stereo mode, and one of the first, second, and third sound generating devices may be configured to provide sound in response to the display device being driven in a mono mode.

The second sound generating device may be attached to the second surface of the display panel, and wherein the second sound generating device may be a vibration generating device configured to vibrate the display panel in accordance with a second sound signal for generating the second sound.

The display device may further include: a third sound generating device configured to provide a third sound in accordance with a third sound signal.

A sound pressure level of the first sound in a high frequency band may be higher than a sound pressure level of the third sound in the high frequency band, the sound pressure level of the third sound in a low frequency band may be higher than the sound pressure level of the first sound in the low frequency band, wherein a sound pressure level of the second sound in the high frequency band may be higher than the sound pressure level of the third sound in the high frequency band, and wherein the sound pressure level of the third sound in the low frequency band may be higher than the sound pressure level of the second sound in the low frequency band.

The third sound generating device may be disposed on a circuit board disposed on the second surface of the display panel.

The third sound generating device may be configured to provide the third sound signal as a haptic signal for providing various haptic feedback to a user.

One of the first sound generating device and second sound generating device may be configured to provide sound in response to the display device being driven in a call mode, wherein the first and second sound generating devices, or the first, second, and third sound generating devices may be configured to provide sound in response to the display device being driven in a stereo mode, and wherein one of the first and second sound generating devices may be configured to provide sound in response to the display device being driven in a mono mode.

The first sound generating device may be disposed on one side of the second surface of the display panel, and the second sound generating device maybe disposed on the other side of the second surface of the display panel.

In response to the display device being driven in a call mode, one of the first sound generating device and the second sound generating device that is disposed closer to an ear of a user than the other may be configured to provide sound.

In response to the display device being driven in a call mode, one of the first sound generating device and the second sound generating device that is located higher than the other is configured to provide sound.

The third sound generating device may be a speaker device.

One of the first and second sound generating devices may be configured to provide sound in response to the display device being driven in a call mode, at least two of the first, second, and third sound generating devices may be configured to provide sound in response to the display device being driven in a stereo mode, and wherein at least one of the first, second, and third sound generating devices may be configured to provide sound in response to the display device being driven in a mono mode.

The display device may further include: a third sound generating device configured to provide a third sound in accordance with a third sound signal, the third sound generating device being a speaker device; and a fourth sound generating device configured to provide a fourth sound in accordance with a fourth sound signal, the fourth sound generating device being a vibration generating device.

The third and fourth sound generating devices may be disposed on a circuit board disposed on the second surface of the display panel.

The third sound generating device may be configured to provide the fourth sound signal as a haptic signal for providing various haptic feedback to a user.

A sound pressure level of the fourth sound in a low frequency band may be higher than sound pressure level of the first, second, and third sounds in the low frequency band, the sound pressure level of the third sound in a medium frequency band may be higher than sound pressure level of the first, second, and fourth sounds in the medium frequency band, the medium frequency band being higher than the low frequency band, and the sound pressure level of the first or second sound in a high frequency band may be higher than sound pressure level of the third or fourth sound in the high frequency band, the high frequency band being higher than the medium frequency band.

A sound pressure level of the fourth sound in a low frequency band may be higher than sound pressure level of the first, second, and third sounds in the low frequency band, the sound pressure level of the third sound in a medium frequency band may be higher than sound pressure level of the first, second, and fourth sounds in the medium frequency band, the medium frequency band being higher than the low frequency band, the sound pressure level of the second sound in a second high frequency band may be higher than sound pressure level of the first, third, and fourth sounds in the second high frequency band, the second high frequency band being higher than the medium frequency band, and the sound pressure level of the first sound in a first high frequency band may be higher than sound pressure level of the second, third, and fourth sounds in the first high frequency band, the first high frequency band being higher than the second high frequency band.

One of the first and second sound generating devices may be configured to provide sound in response to the display device being driven in a call mode, at least two of the first, second, and third sound generating devices, or at least two of the first, second, and third sound generating devices and the fourth sound generating device may be configured to provide sound in response to the display device being driven in a stereo mode, and one of the first, second, and third sound generating devices may be configured to provide sound in response to the display device being driven in a mono mode.

According to the aforementioned and other exemplary embodiments of the present disclosure, since one or more sound generating devices can be implemented as vibration generating devices and can be attached to the bottom surface of a display panel, any sound generating devices can be eliminated from the front of a display device, and as a result, the display area at the front of the display device can be widened.

Also, since one or more sound generating devices can be attached to the bottom surface of the display panel and can be connected to a sound circuit board below the display panel and the sound circuit board can be connected to a display circuit board, the sound generating devices and the sound circuit board can be incorporated into a single module with the display panel.

Also, since one or more sound generating devices can be implemented as vibration generating devices and can be attached to the bottom surface of the display panel and to a main circuit board, the sound generating devices can be prevented or limited from being exposed to the outside, and the waterproof and dustproof characteristics of the display device can be improved.

Also, since sound can be provided using at least two sound generating devices, stereo sound with 2 channels can be provided.

Also, since sound generating devices can provide sounds having different frequency bands, the frequency band of sound to be provided to a user can be widened, and richer sound can be provided.

Also, since sound can be output using one of a number of sound generating devices in a mono mode, the power consumption of the display device can be reduced in the mono mode than in a stereo mode.

Other features and exemplary embodiments may be apparent from the following detailed description, the drawings, and the claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
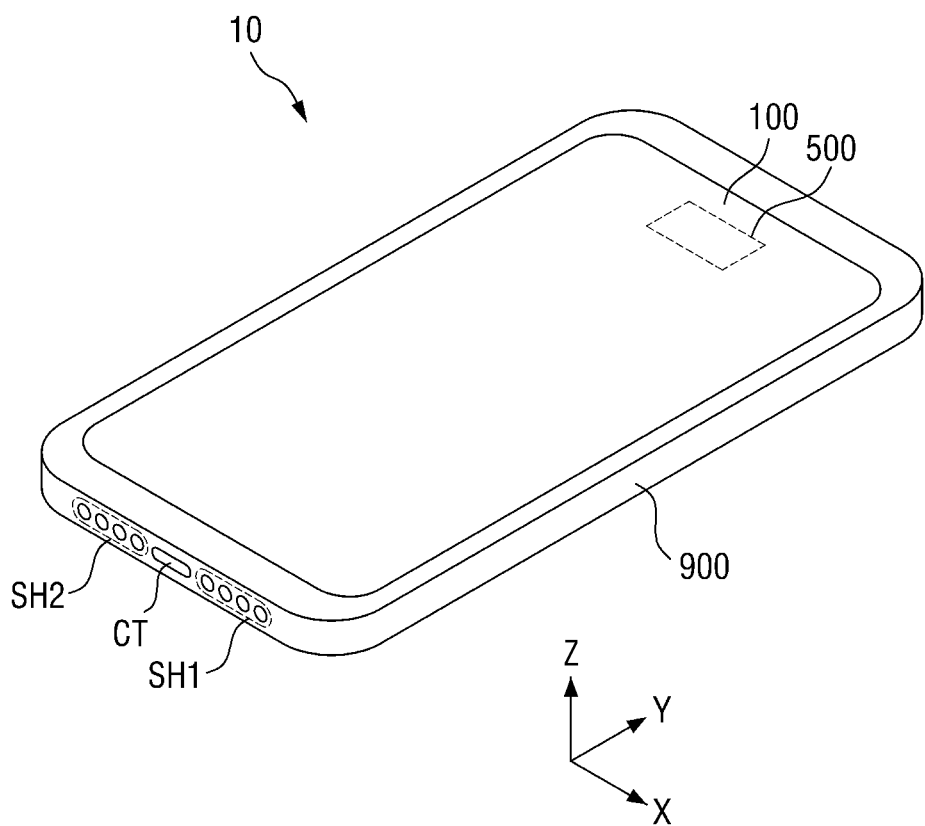
FIGS. 1A and 1B are a perspective view and an exploded perspective view, respectively, of a display device constructed according to an exemplary embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
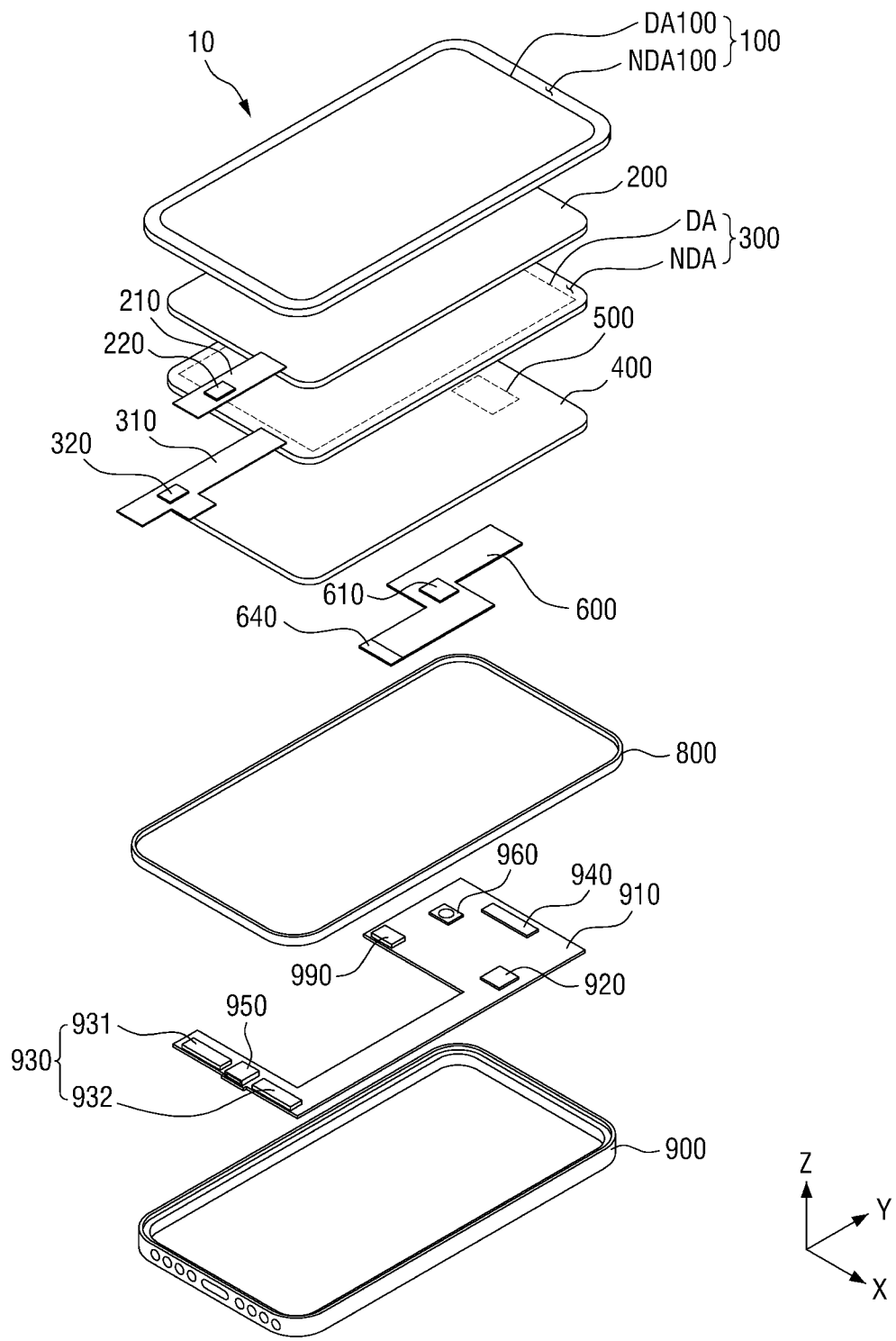
Figure 2:
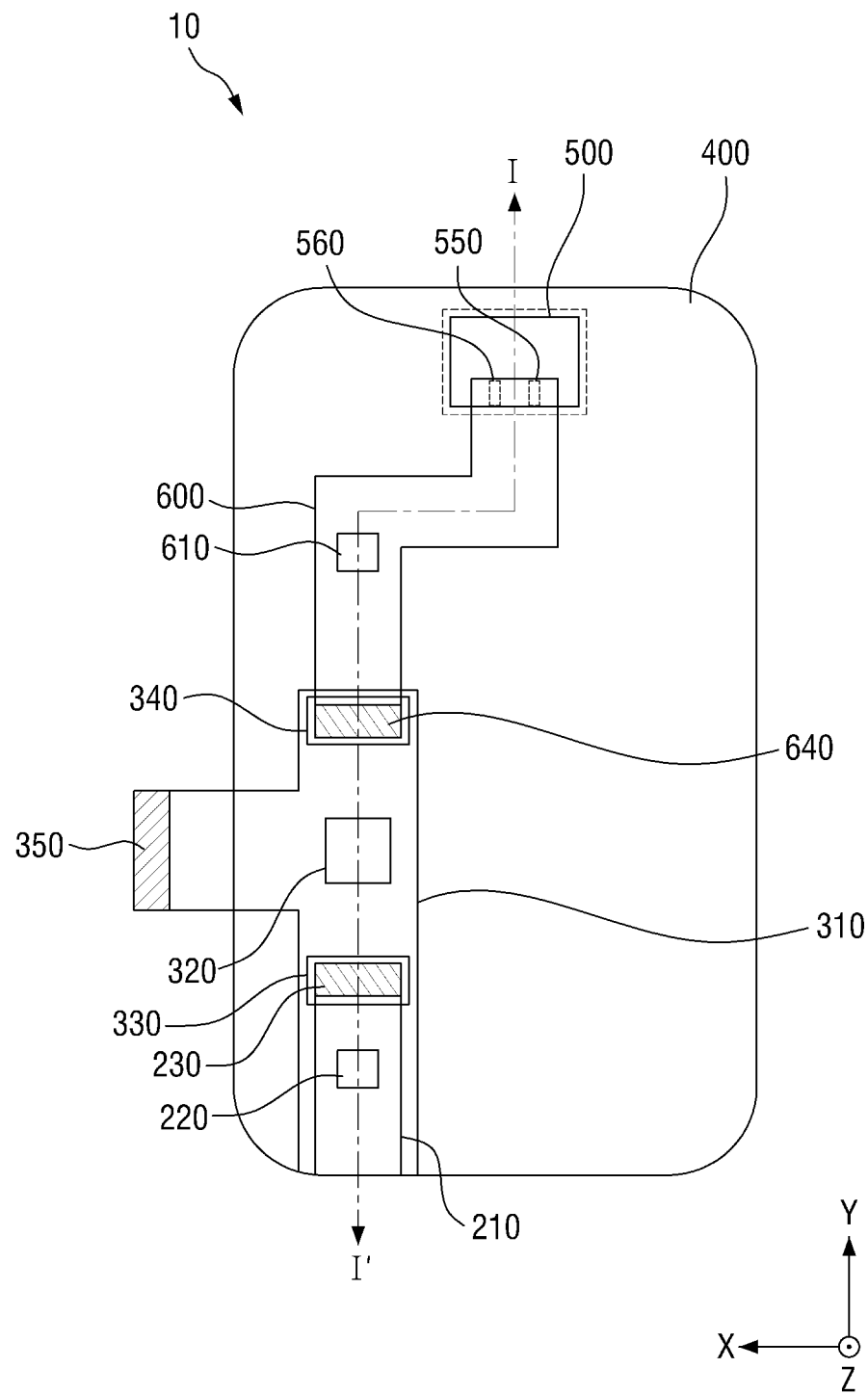
FIG. 2 is a rear view illustrating a panel bottom member, a first sound generating device, a sound circuit board, a panel circuit board, and a touch circuit board of the display device of FIGS. 1A and 1B.
Figure 3:
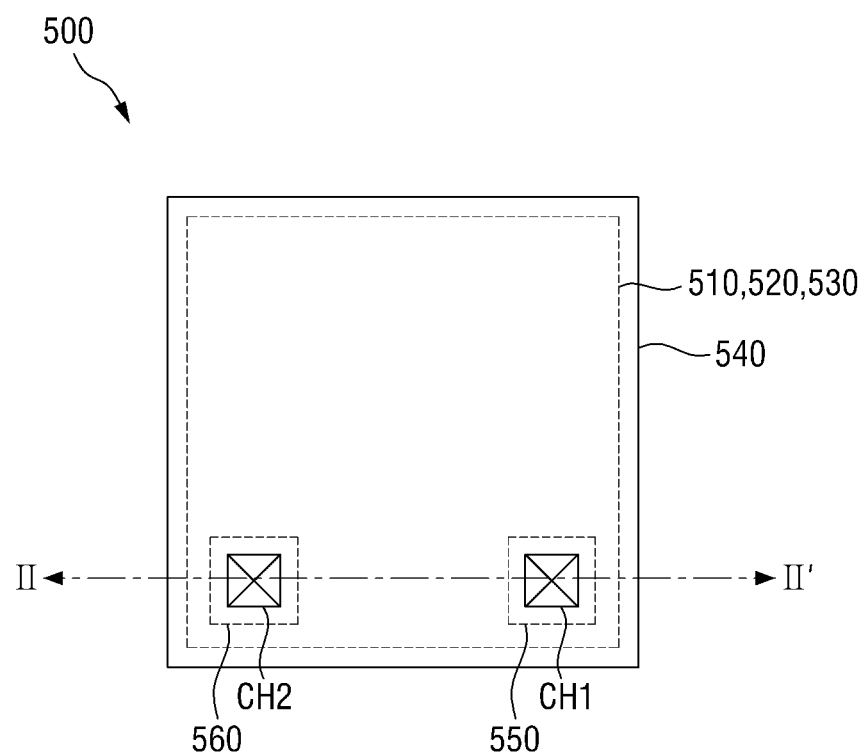
FIG. 3 is a plan view illustrating the first sound generating device of the display device of FIGS. 1A and 1B.
Figure 4:
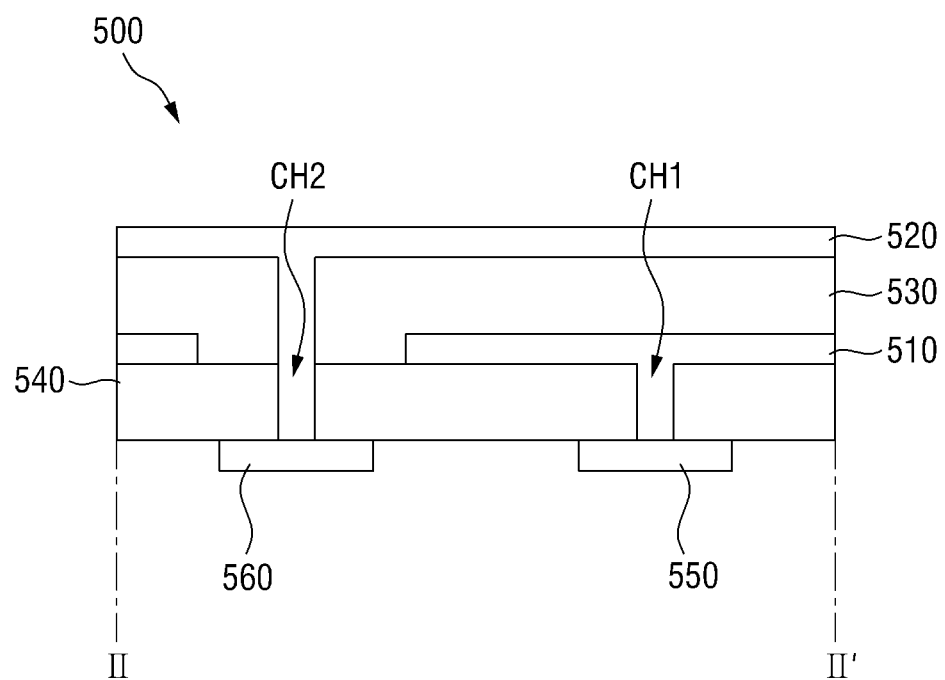
FIG. 4 is a cross-sectional view taken along a sectional line II-IF of FIG. 3.
Figure 5:
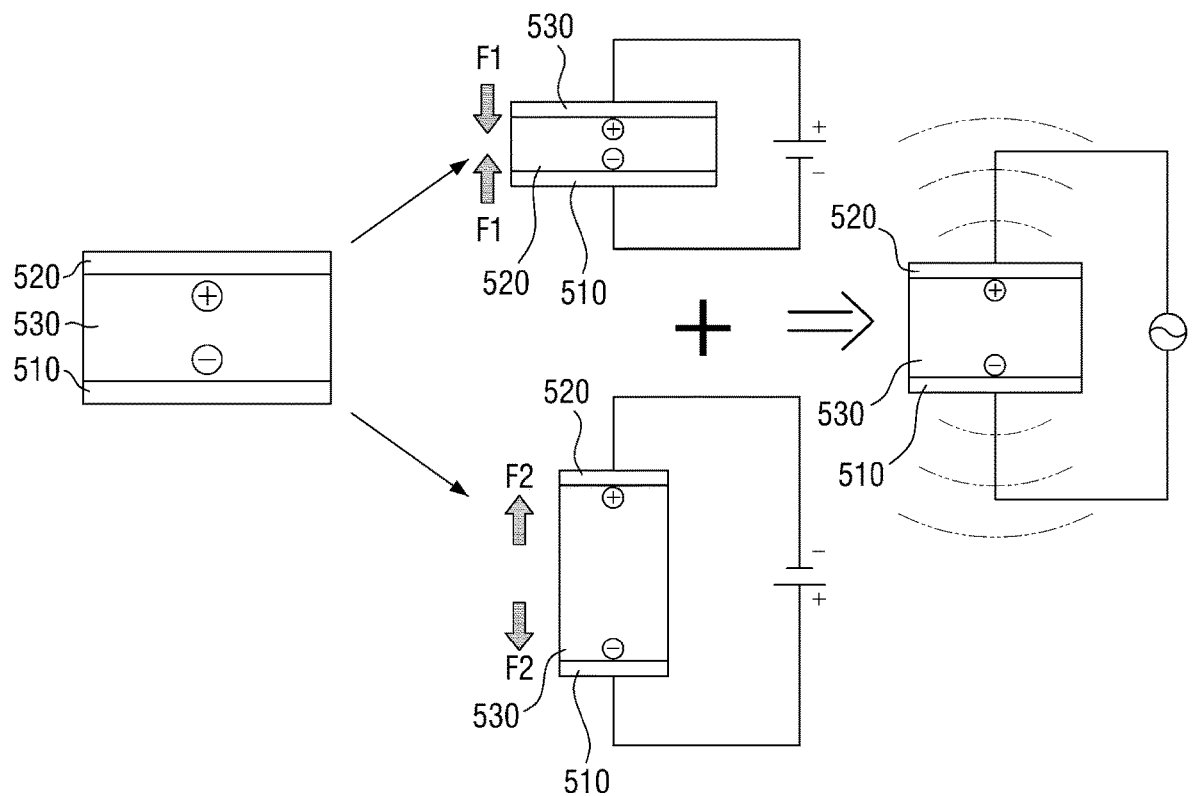
FIG. 5 is a schematic view illustrating vibration of the first sound generating device of the display device of FIGS. 1A and 1B.
Figure 6:
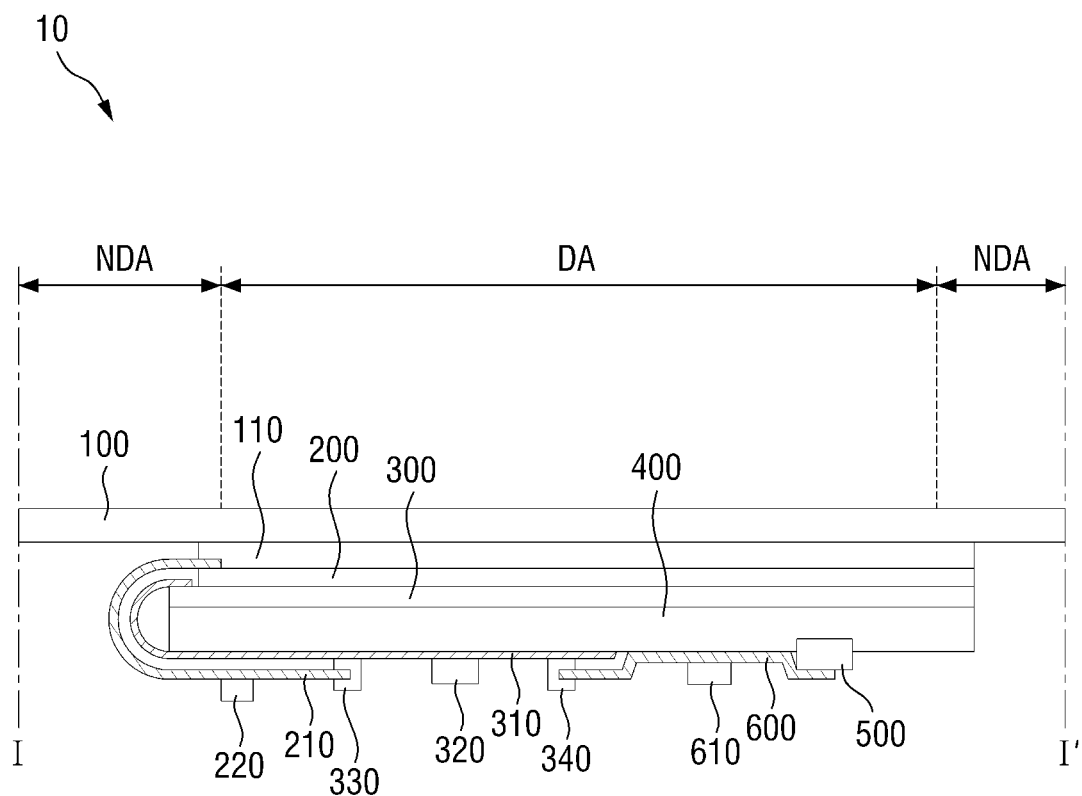
FIG. 6 is a cross-sectional view taken along a sectional line I-I' of FIG. 2.
Figure 7:
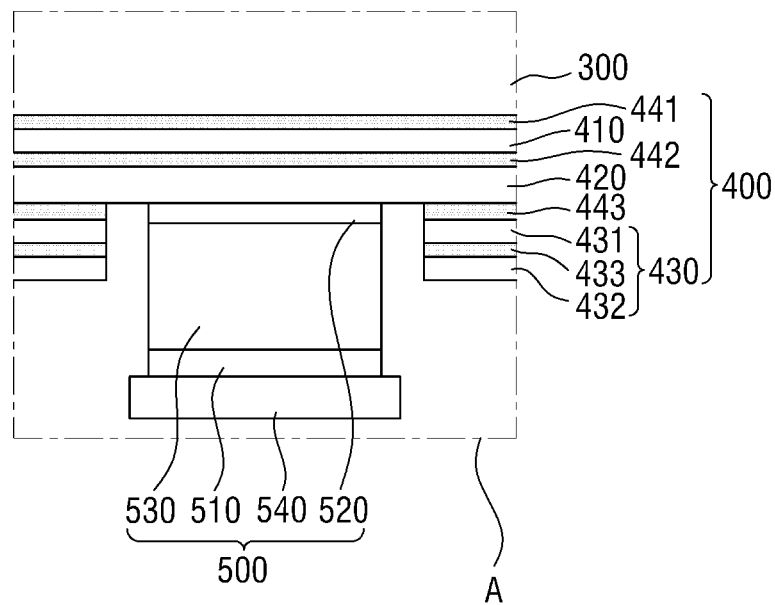
FIG. 7 is an enlarged cross-sectional view illustrating an area A of FIG. 6.

FIGS. 1A and 1B are a perspective view and an exploded perspective view, respectively, of a display device constructed according to an exemplary embodiment of the present disclosure. FIG. 2 is a rear view illustrating a panel bottom member, a first sound generating device, a sound circuit board, a panel circuit board, and a touch circuit board of the display device of FIGS. 1A and 1B. FIG. 3 is a plan view illustrating the first sound generating device 500 of the display device of FIGS. 1A and 1B. FIG. 4 is a cross-sectional view taken along a sectional line II-IF of FIG. 3 FIG. 5 is a schematic view illustrating vibration of the first sound generating device 500 of the display device of FIGS. 1A and 1B. FIG. 5 is a schematic view illustrating vibration of the first sound generating device of the display device of FIGS. 1A and 1B. FIG. 6 is a cross-sectional view taken along a sectional line I-I' of FIG. 2. FIG. 7 is an enlarged cross-sectional view illustrating an area A of FIG. 6.

Referring to FIGS. 1A and 1B, a display device 10 may be a mobile terminal. Examples of the mobile terminal may include a smartphone, a tablet personal computer (PC), a personal digital assistant (PDA), a portable multimedia player (PMP), a game console, a wristwatch-type electronic device, and the like. However, the display device 10 is not limited to being a mobile terminal, and may be used not only in a large-sizes electronic device such as a television (TV) or an external billboard, but also in a mid- or small-size electronic device such as a monitor, a laptop computer, a car navigation device, or a camera.

The display device 10 includes a cover window 100, a touch sensing device 200, a touch circuit board 210, a display panel 300, a display circuit board 310, a panel bottom member 400, a first sound generating device 500, a sound circuit board 600, a lower frame 800, a main circuit board 910, and a lower cover 900.

The terms "above", "top", and "top surface", as used herein, denote a direction in which the cover window 100 is disposed with respect to the display panel 300, i.e., a Z-axis direction, and the terms "below", "bottom", and "bottom surface", as used herein, denote a direction in which the panel bottom member 400 is disposed with respect to the display panel 300, i.e., the direction opposite to the Z-axis direction.

The display device 10 may have a rectangular shape in a plan view. For example, referring to FIG. 1A, in a plan view, the display device 10 may have a rectangular shape having short sides extending in a first direction (or the X-axis direction) and long sides extending in a second direction (or a Z-axis direction). The corners where the short sides and the long sides meet may be rounded with a predetermined curvature, as illustrated in FIG. 1A, or may be right-angled. The planar shape of the display device 10 is not particularly limited, and the display device 10 may be formed in various other shapes such as a polygonal shape other than a rectangular shape, a circular shape, or an elliptical shape.

The cover window 100 may be disposed on the display panel 300 to cover the top surface of the display panel 300. Accordingly, the cover window 100 may protect the top surface of the display panel 300. Referring to FIG. 6, the cover window 100 may be attached to the touch sensing device 200 via an adhesive layer 110. The adhesive layer 110 may be an optically clear adhesive (OCA) or an optically clear resin (OCR).

The cover window 100 may include a light-transmitting portion DA100, which corresponds to a display area DA of the display panel 300, and a light-blocking portion NDA100, which corresponds to a non-display area NDA of the display device 10. The light-blocking portion NDA100 of the cover window 100 may be formed to be opaque. In a case where the light-blocking portion NDA100 does not display an image, the light-blocking portion NDA100 of the cover window 100 may be formed as a decorative layer that can be seen by a user. For example, a company's logo such as SAMSUNG® or a string of various characters or letters may be patterned into the light-blocking portion NDA100 of the cover window 100.

The cover window 100 may be formed of glass, sapphire, and/or plastic. The cover window 100 may be formed to be rigid or flexible.

The touch sensing device 200 may be disposed between the cover window 100 and the display panel 300. The touch sensing device 200, which is a device for detecting the location of touch input from the user, may be implemented as being of a capacitive type such as a self-capacitance type or a mutual capacitance type or of an infrared type.

The touch sensing device 200 may be formed as a panel or a film. Also, the touch sensing device 200 may be formed in one integral body with the display panel 300. For example, in a case where the touch sensing device 200 is formed as a film, the touch sensing device 200 may be formed in one integral body with a barrier film 306 for encapsulating the display panel 300.

The touch sensing device 200 may include a pressure sensor for sensing pressure input from the user. Also, a separate pressure sensing device including a pressure sensor capable of sensing pressure input from the user may be attached to the touch sensing device 200.

The touch circuit board 210 may be attached to one side of the touch sensing device 200. Specifically, the touch circuit board 210 may be attached to pads provided on one side of the touch sensing device 200 via anisotropic conductive films. Referring to FIG. 2, a touch connecting portion 230 may be provided at the touch circuit board 210 and may be connected to a first connector 330 of the display circuit board 310. The touch circuit board 210 may be a flexible printed circuit board or a chip-on-film.

A touch driving circuit 220 may apply touch driving signals to the touch sensing device 200, may detect sensing signals from the touch sensing device 200, and may calculate the location of touch input from the user by analyzing the detected sensing signals. The touch driving circuit 220 may be formed as an integrated circuit and may be mounted on the touch circuit board 210.

The display panel 300 may include a display area DA and a non-display area NDA. The display area DA may be an area in which an image is displayed, and the non-display area NDA may be an area in which no image is displayed and may be on the periphery of the display area DA. The non-display area NDA may be disposed to surround the display area DA, as illustrated in FIGS. 1A and 1B, but the exemplary embodiments are not limited thereto. The display area DA may be disposed to overlap with a light-transmitting portion DA100 of the cover window 100, and the non-display area NDA may be disposed to overlap with a light-blocking portion NDA100 of the cover window 100.

The display panel 300 may be a light-emitting display panel including light-emitting elements. For example, the display panel 300 may be an organic light-emitting diode (OLED) display panel using OLEDs, a micro-light-emitting diode (mLED) display panel using mLEDs, or a quantum-dot light-emitting diode (QLED) display panel using QLEDs. In the description that follows, it is assumed that the display panel 300 is an OLED display panel, and the display panel 300 will be described later in further detail with reference to FIG. 8.

A polarizing film may be attached to the top surface of the display panel 300 to prevent or reduce visibility deterioration caused by the reflection of external light.

The display circuit board 310 may be attached to one side of the display panel 300. Specifically, the display circuit board 310 may be attached to pads provided on one side of the display panel 300 via anisotropic conductive films.

Referring to FIG. 6, the touch circuit board 210 and the display circuit board 310 may be bent from the top to the bottom of the display panel 300. On the other hand, the sound circuit board 600 is disposed below the panel bottom member 400 and is thus not bent. The display circuit board 310 may be connected to the touch connecting portion 230 of the touch circuit board 210 via the first connector 330. The display circuit board 310 may be connected to a sound connecting portion 640 of the sound circuit board via a second connector 340. The display circuit board 310 may be connected to the main circuit board 910 via a third connector 350. FIG. 2 illustrates an example in which the display circuit board 310 includes the first, second, and third connectors 330, 340, and 350, but the exemplary embodiments are not limited thereto. In another example, the display circuit board 310 may include pads, instead of the first and second connectors 330 and 340, in which case, the display circuit board 310 may be connected to the touch circuit board 210 and the sound circuit board 600 via anisotropic conductive films.

A display driving circuit 320 outputs signals and voltages for driving the display panel 300 via the display circuit board 310. The display driving circuit 320 may be formed as an integrated circuit and may be mounted on the display circuit board 310, but the exemplary embodiments are not limited thereto. Also, the display driving circuit 320 may be attached to one side of the display panel 300.

The panel bottom member 400 may be disposed on the bottom surface of the display panel 300. The panel bottom member 400 may include at least one of a heat dissipation layer for efficiently emitting heat from the display panel 300, an electromagnetic wave shielding layer for shielding electromagnetic waves, a light shielding layer for blocking light incident from the outside, a light absorbing layer for absorbing light, and a buffer layer for absorbing external shock.

Specifically, referring to FIG. 7, the panel bottom member 400 may include a light absorbing member 410, a buffer member 420, a heat dissipation member 430, and first, second, and third adhesive layers 441, 442, and 443.

The light absorbing member 410 may be disposed below the display panel 300. The light absorbing member 410 blocks the transmission of light and thus prevents or reduces the element disposed therebelow, i.e., the first sound generating device 500, from being visible from above the display panel 300. The light absorbing member 410 may include a light absorbing material such as a black pigment or dye.

The buffer member 420 may be disposed below the light absorbing member 410. The buffer member 420 absorbs external shock and thus prevents or reduces the display panel 300 from being damaged. The buffer member 420 may be formed as a single- or multilayer film. For example, the buffer member 420 may be formed of a polymer resin such as polyurethane, polycarbonate, polypropylene, or polyethylene or may include an elastic material such as a sponge obtained by foam-molding rubber, a urethane-based material, or an acrylic material. The buffer member 420 may be a cushion layer.

The heat dissipation member 430 may be disposed below the buffer member 420. The heat dissipation member 430 may include at least one heat dissipation layer. For example, referring to FIG. 7, the heat dissipation member 430 may include a first heat dissipation layer 431, which includes graphite or carbon nanotubes, a second heat dissipation layer 432, which is formed as a metal thin film using a metal with excellent thermal conductivity such as copper, nickel, ferrite, or silver, and a fourth adhesive layer 433, which is for bonding the first and second heat dissipation layers 431 and 432.

The first adhesive layer 441 attaches the light absorbing member 410 to the bottom surface of the display panel 300. The second adhesive layer 442 attaches the buffer member 420 to the bottom surface of the light absorbing member 410. The third adhesive layer 443 attaches the heat dissipation member 430 to the bottom surface of the buffer member 420. The first, second, and third adhesive layers 441, 442, and 443 may contain a polymer material such as a silicone-based polymer, a urethane-based polymer, a silicone-urethane hybrid polymer, an acrylic polymer, an isocyanate polymer, a polyvinyl alcohol polymer, a gelatin polymer, a vinyl polymer, a latex polymer, a polyester polymer, or a water-based polyester polymer.

The first sound generating device 500 may be attached to the bottom surface of the panel bottom member 400. In a case where the first sound generating device 500 is disposed on the heat dissipation member 430 of the panel bottom member 400, the first heat dissipation layer 431 or the second heat dissipation layer 432 of the heat dissipation member 430 may be broken by vibration of the first sound generating device 500. Thus, the heat dissipation member 430 may be removed from an area where the second sound generating device 500 is disposed, and the first sound generating device 500 may be disposed on the buffer member 420.

The first sound generating device 500 may output first sound by causing vibration in response to a first sound signal. To this end, the first sound generating device 500 may be caused to vibrate by a vibration layer 530, which is deformed in response to the first sound signal. Also, the first sound generating device 500 may be caused to vibrate by an electromagnetic force generated by flowing a current to a coil surrounding a magnet in response to the first sound signal. The first sound generating device 500 will hereinafter be described as generating sound by being caused to vibrate by the vibration layer 530.

Referring to FIGS. 3 and 4, the first sound generating device 500 may include a first electrode 510, a second electrode 520, the vibration layer 530, a substrate 540, a first pad 550, and a second pad 560.

The first electrode 510 may be disposed on a first surface of the substrate 540, the vibration layer 530 may be disposed on the first electrode 510, and the second electrode 520 may be disposed on the vibration layer 530. The first and second pads 550 and 560 may be disposed on a second surface of the substrate 540.

The first and second electrodes 510 and 520 may be formed of a conductive material. For example, the conductive material may be a transparent conductive material such as indium tin oxide (ITO) or indium zinc oxide (IZO), an opaque metal material, a conductive polymer, or carbon nanotubes (CNTs).

The first electrode 510 may be connected to the first pad 550 via a first contact hole CHT1, which penetrates the substrate 540. Accordingly, the first electrode 510 may receive a first driving voltage of the sound driving circuit 610 of the sound circuit board 600 via the first pad 550.

The second electrode 520 may be connected to the second pad 560 via a second contact hole CH2, which penetrates the vibration layer 530 and the substrate 540. Accordingly, the second electrode 520 may receive a second driving voltage of the sound driving circuit 610 of the sound circuit board 600 via the second pad 560.

Referring to FIG. 5, the vibration layer 530 may be a piezoelectric actuator that is deformed in accordance with the difference between voltages applied to the first and second electrodes 510 and 520. The vibration layer 530 may be at least one of a piezoelectric body such as a poly (vinylidene fluoride) (PVDF) film or lead zirconate titanate (PZT) ceramic and an electroactive polymer.

In this case, the vibration layer 530 may contract in accordance with a first force F1 or may relax or expand in accordance with a second force F2 depending on the difference between the first and second driving voltages applied to the first and second electrodes 510 and 520, respectively. Specifically, referring to FIG. 5, in a case where a part of the vibration layer 530 adjacent to the first electrode 510 has positive polarity and a part of the vibration layer 530 adjacent to the second electrode 520 has negative polarity, a first driving voltage having positive polarity and a second driving voltage having negative polarity may be applied to the first and second electrodes 510 and 520, respectively, and as a result, the vibration layer 530 may contract in accordance with the first force F1. On the other hand, in a case where the part of the vibration layer 530 adjacent to the first electrode 510 has negative polarity and the part of the vibration layer 530 adjacent to the second electrode 520 has positive polarity, a first driving voltage having negative polarity and a second driving voltage having positive polarity may be applied to the first and second electrodes 510 and 520, respectively, and as a result, the vibration layer 530 may expand in accordance with the second force F2. As the polarities of the first and second driving voltages applied to the first and second electrodes 510 and 520, respectively, alternate between positive polarity and negative polarity, the vibration layer 530 repeats contracting and relaxing. Accordingly, the first sound generating device 500 vibrates, and the display panel 300 vibrates vertically. As a result, the first sound may be output.

Also, since the first sound generating device 500 outputs the first sound by causing the display panel 300 to vibrate, the display panel 300 may serve as a diaphragm. As the size of a diaphragm increases, the sound pressure of a sound output from the diaphragm increases. The size of a diaphragm of a speaker that is applicable to the display device 10 is smaller than the area of the display panel 300. Thus, by using the display panel 300 as a diaphragm, the sound pressure of a sound can be increased as compared to the case of using a speaker.

Also, since the first sound generating device 500 outputs the first sound by causing the display panel 300 to vibrate, the display device 10 can output sound using a sound generating device that is not exposed to the outside. Accordingly, any sound generating devices can be eliminated from the front of the display device 10, and as a result, the light-transmitting portion DA100 of the cover window 100 can be widened. That is, the display area DA of the display device 10 can be widened.

The substrate 540 may be formed of an insulating material such as, for example, plastic.

The first and second pads 550 and 560 may be connected to the sound circuit board 600. The first and second pads 550 and 560 may be formed of a conductive material.

The first sound generating device 500 may be connected to the sound circuit board 600. Specifically, the sound circuit board 600 may be attached on the first and second pads 550 and 560 of the first sound generating device 500 via anisotropic conductive films. Referring to FIG. 2, the sound connecting portion 640 may be provided at the sound circuit board 600 and may be connected to the second connector 340 of the display circuit board 310. The sound circuit board 600 may be a flexible printed circuit board or a chip-on-film.

The sound driving circuit 610 may be formed as an integrated circuit and may be mounted on the sound circuit board 600. The sound driving circuit 610 may generate the first sound signal in response to first sound data provided by the main processor 920 of the main circuit board 910. In this case, the first sound data from the main processor 920 may be provided to the sound driving circuit 610 via the main circuit board 910, the display circuit board 310, and the sound circuit board 600, and the first sound signal from the sound driving circuit 610 may be transmitted to the first sound generating device 500 via the sound circuit board 600.

The sound driving circuit 610 may include a digital signal processor (DSP) processing the first sound data, which is a digital signal, a digital-to-analog converter (DAC) converting the first sound data processed by the DSP into the first sound signal, which is an analog signal, and an amplifier amplifying and outputting the first sound signal produced by the DAC.

In the display device 10, the first sound generating device 500 is attached to the panel bottom member 400, which is disposed below the display panel 300, and is connected to the sound circuit board 600 having the sound driving circuit 610 mounted thereon, and the sound driving circuit 610 is connected to the display circuit board 310. As a result, the first sound generating device 500 and the sound circuit board 600 can be incorporated into a single module with the display panel 300.

The lower frame 800 may be disposed below the panel bottom member 400 and the sound circuit board 600. The lower frame 800 may be disposed to surround the cover window 100, the touch sensing device 200, the display panel 300, the panel bottom member 400, the first sound generating device 500, the touch circuit board 210, the display circuit board 310, and the sound circuit board 600. The lower frame 800 may include a synthetic resin, a metal, or both.

The sides of the lower frame 800 may be exposed to the sides of the display device 10. Also, the lower frame 800 may not be provided, and only the lower cover 900 may exist.

The main circuit board 910 may be disposed below the lower frame 800. The main circuit board 910 may be connected to the third connector 350 of the display circuit board 310 via a cable connected to the main connector 990. As a result, the main circuit board 910 may be connected to the display circuit board 310, the touch circuit board 210, and the sound circuit board 600. The main circuit board 910 may be a printed circuit board or a flexible printed circuit board.

Referring to FIG. 1B, the main circuit board 910 may include the main processor 920, the second sound generating device 930, the third sound generating device 940, a charging terminal 950, and a camera device 960.

The main processor 920 may control all functions of the display device 10. For example, the main processor 920 may output image data to the display driving circuit 320 of the display circuit board 310 so as for the display panel 300 to display an image. Also, for example, the main processor 920 may output the first sound data to the sound driving circuit 610 of the sound circuit board 600 via the display circuit board 310 so as for the first sound generating device 500 to output sound. Also, for example, the main processor 920 may output second sound data to the second sound generating device 930 so as for the second sound generating device 930 to output sound and may output third sound data to the third sound generating device 940 so as for the third sound generating device 940 to output sound. The main processor 920 may control the driving of the camera device 960.

The main processor 920 may be an application processor consisting of an integrated circuit.

The second and third sound generating devices 930 and 940 may be speakers. For example, each of the second and third sound generating devices 930 and 940 may include a DSP, a DAC, an amplifier, and a sound output portion. In this example, the DAC of each of the second and third sound generating devices 930 and 940 may process sound data from the main processor 920, the DAC of each of the second and third sound generating devices 930 and 940 may convert the processed sound data into a sound signal, which is an analog signal, the amplifier of each of the second and third sound generating devices 930 and 940 may amplify and output the sound signal, and the sound output portion of each of the second and third sound generating devices 930 and 940 may output sound in accordance with the sound signal. Accordingly, the second sound generating device 930 may output second sound in accordance with a second sound signal obtained from the second sound data from the main processor 920, and the third sound generating device 940 may output third sound in accordance with a third sound signal obtained from the third sound data from the main processor 920.

In another example, each of the second and third sound generating devices 930 and 940 may only include a sound output portion. In this example, the second sound generating device 930 may output the second sound in accordance with the second sound signal from the main processor 920, and the third sound generating device 940 may output the third sound in accordance with the third sound signal from the main processor 920.

The second sound generating device 930 may be disposed on one side of the main circuit board 910, and the third sound generating device 940 may be disposed on the other side of the main circuit board 910. For example, referring to FIGS. 1A and 1B, the second sound generating device 930 may be disposed on a first side of the main circuit board 910 and may provide the second sound via speaker holes SH1 and SH2, which are provided on a first side of the lower cover 900, from a first side of the display device 10. Also, for example, the third sound generating device 940 may be disposed on a second side of the main circuit board 910 and may provide the third sound via speaker holes, which are provided on a second side of the lower cover 900, from a second side of the display device 10. The first and second sides of the display device 10 may be opposite to each other, but the exemplary embodiments are not limited thereto.

FIGS. 1A and 1B illustrate an example in which the second sound generating device 930 includes first and second sub-sound generating devices 931 and 932, which are disposed on opposite sides of the charging terminal 950, but the exemplary embodiments are not limited thereto. In another example, the second sound generating device 930 may be disposed on only one side of the charging terminal 950. In yet another example, the charging terminal 950 may be disposed at a location where one of the first and second sub-sound generating devices 931 and 932 is disposed, and the other sub-sound generating device may be disposed at a location where the charging terminal 950 is not disposed.

The charging terminal 950 may be a terminal receiving power from the outside and may be connected to a power supply unit of the main circuit board 910.

The camera device 960 processes image frames obtained by an image sensor during a camera mode, such as still or moving images, and outputs the processed image frames to the main processor 920.

A mobile communication module, which can exchange wireless signals with at least one of a base station, an external terminal, and a server via a mobile communication network, may be further provided on the main circuit board 910. The wireless signals may include various types of data associated with the transmission/reception of audio signals, video call signals, or text/multimedia messages.

The lower cover 900 may be disposed below the lower frame 800 and the main circuit board 910. A charging terminal hole CT for exposing a charging terminal 950 and the speaker holes SH1 and SH2 for outputting sound from the third sound generating device 940 may be formed on one side of the lower cover 900. The lower cover 900 may form the bottom exterior of the display device 10. The lower cover 900 may include plastic and/or a metal.

Figure 8:
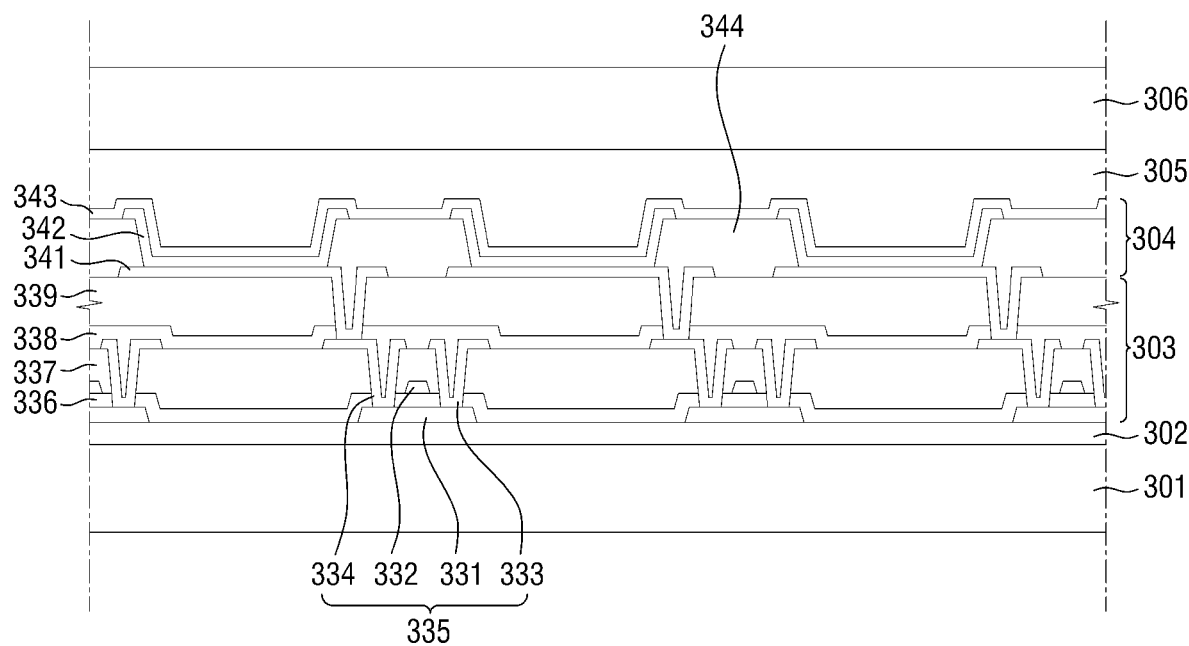
FIG. 8 is a cross-sectional view illustrating a display area of a display panel of FIG. 6.

FIG. 8 is a cross-sectional view illustrating the display area of the display panel of FIG. 6. FIG. 8 illustrates an example in which the display panel 300 is an OLED display panel using OLEDs. The display area DA of the display panel 300 is an area in which a light-emitting element layer 304 is formed and an image is displayed, and the non-display area NDA of the display panel 300 is an area which is on the periphery of the display area DA.

Referring to FIG. 8, the display panel 300 may include a supporting substrate 301, a flexible substrate 302, a thin-film transistor (TFT) layer 303, the light-emitting element layer 304, an encapsulation layer 305, and a barrier film 306.

The flexible substrate 302 is disposed on the supporting substrate 301. The supporting substrate 301 and the flexible substrate 302 may include a polymer material having flexibility. For example, the supporting substrate 301 and the flexible substrate 302 may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CTA), cellulose acetate propionate (CAP), or a combination thereof.

The TFT layer 303 is formed on the flexible substrate 302. The TFT layer 303 includes TFTs 335, a gate insulating film 336, an interlayer insulating film 337, a passivation film 338, and a planarization film 339.

A buffer film may be formed on the flexible substrate 302. The buffer film may be formed on the flexible substrate 302 to protect the TFTs 335 and the light-emitting elements against moisture that may penetrate the supporting substrate 301 and the flexible substrate 302, which are susceptible to moisture. The buffer film may consist of a plurality of inorganic films that are alternately stacked. For example, the buffer film may be formed as a multilayer film in which at least one of a silicon oxide (SiOx) film and a silicon nitride (SiNx) film is alternately stacked. The buffer layer may not be provided.

The TFTs 335 are formed on the buffer film. Each of the TFTs 335 includes an active layer 331, a gate electrode 332, a source electrode 333, and a drain electrode 334. FIG. 8 illustrates an example in which the TFTs 335 have a top gate structure in which the gate electrode 332 is disposed above the active layer 331, but the exemplary embodiments are not limited thereto. In another example, the TFTs 335 may have a bottom gate structure in which the gate electrode 332 is disposed below the active layer 331 or a double gate structure in which the gate electrode 332 is disposed both above and below the active layer 331.

The active layer 331 is formed on the buffer film. The active layer 331 may be formed of a silicon-based semiconductor material or an oxide-based semiconductor material. A light-shielding layer for blocking external light incident on the active layer 331 may be formed between the buffer layer and the active layer 331.

A gate insulating film 336 may be formed on the active layer 331. The gate insulating film 316 may be formed as an inorganic film such as, for example, a silicon oxide film, a silicon nitride film, or a multilayer film thereof.

The gate electrode 332 and a gate line may be formed on the gate insulating film 316. The gate electrode 332 and the gate line may be formed as single- or multilayer films using molybdenum (Mo), aluminum (Al), chromium (Cr), gold (Au), titanium (Ti), nickel (Ni), neodymium (Ne), copper (Cu), or an alloy thereof.

The interlayer insulating film 337 may be formed on the gate electrode 332 and the gate line. The interlayer insulating film 337 may be formed as an inorganic film such as, for example, a silicon oxide film, a silicon nitride film, or a multilayer film thereof.

The source electrode 333, the drain electrode 334, and a data line may be formed on the interlayer insulating film 337. The source electrode 333 and the drain electrode 334 may be connected to the active layer 331 through contact holes penetrating the gate insulating film 336 and the interlayer insulating film 337. The source electrode 333, the drain electrode 334, and the data line may be formed as single- or multilayer films using Mo, Al, Cr, Au, Ti, Ni, Ne, Cu, or an alloy thereof.

The passivation film 338 may be formed on the source electrode 333, the drain electrode 334, and the data line to insulate the TFTs 335. The passivation film 338 may be formed as an inorganic film such as, for example, a silicon oxide film, a silicon nitride film, or a multilayer film thereof.

The planarization film 339 may be formed on the passivation film 338 to planarize height differences formed by the TFTs 335. The planarization film 339 may be formed as an organic film using an acrylic resin, an epoxy resin, a phenolic resin, a polyamide resin, or a polyimide resin.

The light-emitting element layer 304 is formed on the TFT layer 303. The light-emitting element layer 304 includes the light-emitting elements and a pixel-defining film 344.

The light-emitting elements and the pixel-defining film 344 are formed on the planarization film 339. The light-emitting elements may be OLEDs. In this case, each of the light-emitting elements may include an anode electrode 341, a light-emitting layer 342, and a cathode electrode 343.

The anode electrode 341 may be formed on the planarization film 339. The anode electrode 341 may be connected to the source electrode 333 through a contact hole penetrating the passivation film 338 and the planarization film 339.

The pixel-defining film 344 may be formed to cover the edges of the anode electrode 341 to define a corresponding pixel. That is, the pixel-defining film 344 may define each pixel. Each pixel may be a region in which the anode electrode 341, the light-emitting layer 342, and the cathode electrode 343 are sequentially stacked and holes from the anode electrode 341 and electrons from the cathode electrode 343 are combined in the light-emitting layer 342 to emit light.

The light-emitting layer 342 may be formed on the anode electrode 341 and the pixel-defining film 344. The light-emitting layer 342 may be an organic light-emitting layer. The light-emitting layer 342 may emit one of red light, green light, and blue light. The peak wavelength of the red light may range from about 620 nm to 750 nm, the peak wavelength of the green light may range from about 495 nm to 570 nm, and the peak wavelength of the blue light may range from about 450 nm to 495 nm. The light-emitting layer 342 may be a white light-emitting layer emitting white light. In this case, the light-emitting layer 342 may have a stack of red, green, and blue light-emitting layers and may be a common layer formed commonly for all pixels. Also, in this case, the display panel 300 may further include color filters for displaying red, green, and blue colors.

The light-emitting layer 342 may include a hole transport layer, an emission layer, and an electron transport layer. The light-emitting layer 342 may have a tandem structure with two or more stacks, in which case, a charge generating layer may be formed between the stacks.

The cathode electrode 343 may be formed on the light-emitting layer 342. The cathode electrode 343 may be formed to cover the light-emitting layer 342. The cathode electrode 343 may be a common layer formed commonly for all pixels.

In a case where the light-emitting element layer 304 is formed as a top emission-type light-emitting element layer, the anode electrode 341 may be formed of a metal material with high reflectance such as a stack of Al and Ti (e.g., Ti/Al/Ti), a stack of Al and ITO (e.g., ITO/Al/ITO), a silver (Ag)-palladium (Pd)-copper (Cu) (APC) alloy, or a stack of an APC alloy and ITO (e.g., ITO/APC/ITO), and the cathode electrode 343 may be formed of a transparent conductive oxide (TCO) material such as ITO or IZO that can transmit light therethrough or a semi-transmissive conductive material such as magnesium (Mg), Ag, or an alloy thereof. In a case where the cathode electrode 343 is formed of a semi-transmissive conductive material, the emission efficiency of the light-emitting element layer 304 may be improved due to a micro-cavity effect.

In a case where the light-emitting element layer 304 is formed as a bottom emission-type light-emitting element layer, the anode electrode 341 may be formed of a TCO material such as ITO or IZO or a semi-transmissive conductive material such as Mg, Ag, or an alloy thereof, and the cathode electrode 343 may be formed of a metal material with high reflectance such as a stack of Al and Ti (e.g., Ti/Al/Ti), a stack of Al and ITO (e.g., ITO/Al/ITO), an APC alloy, or a stack of an APC alloy and ITO (e.g., ITO/APC/ITO). In a case where the anode electrode 341 is formed of a semi-transmissive conductive material, the emission efficiency of the light-emitting element layer 304 may be improved due to a micro-cavity effect.

The encapsulation layer 305 is formed on the light-emitting element layer 304.

The encapsulation layer 305 prevents or limits the penetration of oxygen or moisture into the light-emitting layer 342 and the cathode electrode 343. The encapsulation layer 305 may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. The encapsulation layer 305 may further include at least one organic film. The organic layer may be formed to a sufficient thickness to prevent or limit particles from entering the light-emitting layer 342 and the cathode electrode 343 through the encapsulation layer 305. The organic film may include one of epoxy, acrylate, and urethane acrylate.

The barrier film 306 is disposed on the encapsulation layer 305. The barrier film 306 is disposed to cover the encapsulation layer 305 to protect the light-emitting element layer 304 against oxygen or moisture. The barrier film 306 may be formed in one integral body with the touch sensing device 200.

Figure 9:
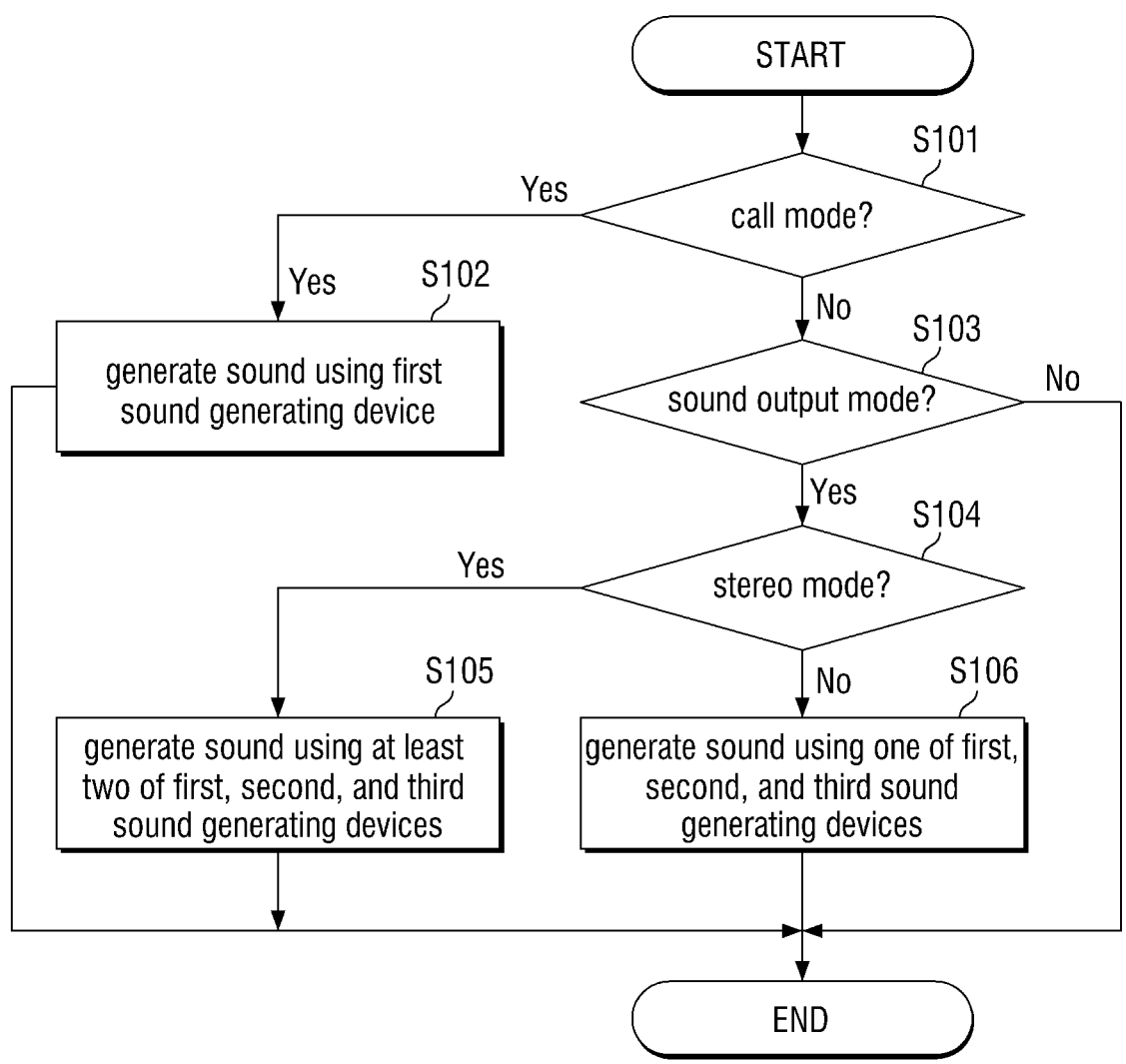
FIG. 9 is a flowchart illustrating a method of driving a display device constructed according to an exemplary embodiment of the present disclosure.

FIG. 9 is a flowchart illustrating a method of driving a display device constructed according to an exemplary embodiment of the present disclosure.

An exemplary sound output method of the display device 10 of FIGS. 1A and 1B, which includes the first, second, and third sound generating devices 500, 930, and 940, will hereinafter be described with reference to FIG. 9.

Referring to FIG. 9, the main processor 920 determines whether the display device 10 is being driven in a call mode (S101). The call mode is a mode in which the user conducts a voice call or a video call via the mobile communication module of the main circuit board 910.

Thereafter, in response to a determination being made that the display device 10 is being driven in the call mode, the main processor 920 generates first sound using the first sound generating device 500 and controls the other party's voice received via the mobile communication module to be output (S102).

Specifically, the main processor 920 outputs first sound data corresponding to the other party's voice received via the mobile communication module to the sound driving circuit 610 via the main circuit board 910, the display circuit board 310, and the sound circuit board 600. The sound driving circuit 610 generates a first sound signal based on the first sound data and outputs the first sound signal to the first sound generating device 500 via the sound driving circuit 610. Accordingly, the first sound generating device 500 can output the first sound in accordance with the first sound signal.

That is, in the call mode, the display device 10 can output the other party's voice via the first sound generating device 500, which is not exposed to the outside. Accordingly, any sound generating devices can be eliminated from the front of the display device 10, and as a result, the light-transmitting portion DA100 of the cover window 100 can be widened.

The main processor 920 determines whether the display device 10 is being driven in a sound output mode (S103). The sound output mode is a mode in which the display device 10 outputs sound by executing an application such as a music player or a video player.

Thereafter, in response to a determination being made that the display device 10 is being driven in the sound output mode, the main processor 920 determines whether the display device 10 is being driven in a stereo mode or a mono mode (S104). The sound output mode includes the stereo mode and the mono mode. The stereo mode is a mode for providing the user with stereo sound of 2 or more channels, and the mono mode is a mode for providing the user with sound of a single channel.

Thereafter, in response to a determination being made that the display device 10 is being driven in the stereo mode, the main processor 920 controls sound to be generated and output via at least two of the first, second, and third sound generating devices 500, 930, and 940 (S105).

For example, the main processor 920 may control the first and second sound generating devices 500 and 930 to generate first and second sounds and may thus provide stereo sound of 2 channels to the user. Specifically, the main processor 920 outputs first sound data to the sound driving circuit 610 via the main circuit board 910, the display circuit board 310, and the sound circuit board 600 and outputs second sound data or a second sound signal to the second sound generating device 930. The sound driving circuit 610 generates a first sound signal based on the first sound data and outputs the first sound signal to the first sound generating device 500. The first sound generating device 500 may output first sound in accordance with the first sound signal. The second sound generating device 930 may output second sound in accordance with a second sound signal generated based on the second sound data or the second sound signal output by the main processor 920.

In another example, the main processor 920 may control the first and third sound generating devices 500 and 940 to generate first and third sounds and may thus provide stereo sound of 2 channels to the user. Specifically, the main processor 920 may output first sound data to the sound driving circuit 610 via the main circuit board 910, the display circuit board 310, and the sound circuit board 600 and may output third sound data or a third sound signal to the third sound generating device 940. The sound driving circuit 610 generates a first sound signal based on the first sound data and outputs the first sound signal to the first sound generating device 500. The first sound generating device 500 may output first sound in accordance with the first sound signal. The third sound generating device 940 may output third sound in accordance with a third sound signal generated based on the third sound data or the third sound signal output by the main processor 920.

In another example, the main processor 920 may control the second and third sound generating devices 930 and 940 to generate second and third sounds and may thus provide stereo sound of 2 channels to the user. Specifically, the main processor 920 may output second sound data or a second sound signal to the second sound generating device 930 and may output third sound data or a third sound signal to the third sound generating device 940. The second sound generating device 930 may output second sound in accordance with a second sound signal generated based on the second sound data or the second sound signal output by the main processor 920. The third sound generating device 940 may output third sound in accordance with a third sound signal generated based on the third sound data or the third sound signal output by the main processor 920.

In another example, the main processor 920 may control the first, second, and third sound generating devices 500, 930, and 940 to generate first sound, second sound, and third sound and may thus provide stereo sound of 2.1 channels to the user. In this case, the third sound generating device 940 may serve as a woofer for outputting low sound. Specifically, the main processor 920 may output first sound data to the sound driving circuit 610 via the main circuit board 910, the display circuit board 310, and the sound circuit board 600, may output second sound data or a second sound signal to the second sound generating device 930, and may output third sound data or a third sound signal to the third sound generating device 940. The sound driving circuit 610 generates a first sound signal based on the first sound data and outputs the first sound signal to the first sound generating device 500. The first sound generating device 500 may output first sound in accordance with the first sound signal. The second sound generating device 930 may output second sound in accordance with a second sound signal generated based on the second sound data or the second sound signal output by the main processor 920. The third sound generating device 940 may output third sound in accordance with a third sound signal generated based on the third sound data or the third sound signal output by the main processor 920.

Figure 10A:
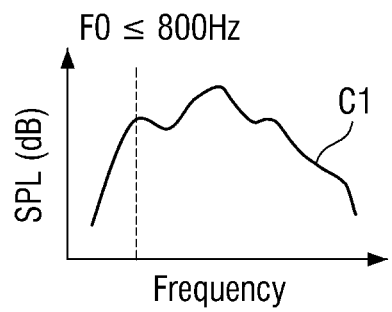
FIGS. 10A, 10B, and 10C are graphs showing the sound pressure levels (SPLs) vs frequency of the first and second sound generating devices of the display device of FIGS. 1A and 1B, and the assembly of the first and second sound generating devices, respectively.
Figure 10B:
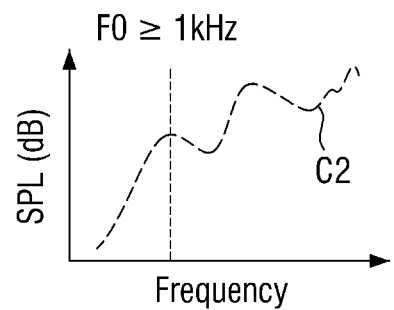
Figure 10C:
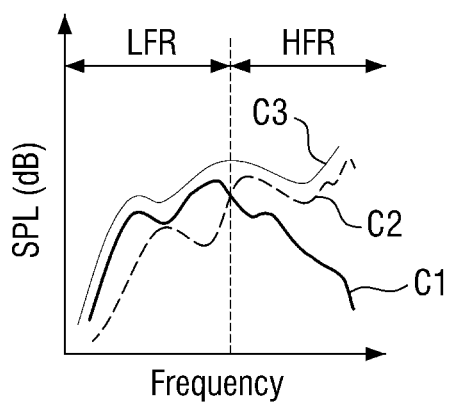

Particularly, in a case where the fundamental frequency F0 of the first sound generating device 500 is controlled differently from the fundamental frequency F0 of the second or third sound generating device 930 or 940, as indicated by curves C1 and C2 of FIGS. 10A and 10B, the frequency band of sound to be provided to the user can be expanded, as indicated by a curve C3 of FIG. 10C, and richer sound can be provided to the user. FIGS. 10A, 10B, and 10C are graphs showing the sound pressure levels (SPLs) vs frequency of the first and second sound generating devices of the display device of FIGS. 1A and 1B, and the assembly of the first and second sound generating devices, respectively. Referring to FIGS. 10A, 10B, and 10C, the X axis represents resonant frequency, the Y axis represents sound pressure level (SPL), and F0 denotes the minimum frequency at which the displacement of the diaphragm of each sound generating device becomes greater than a reference displacement.

Specifically, the second and third sound generating devices 930 and 940 may output second and third sounds having a fundamental frequency F0 of 800 MHz, as illustrated in FIG. 10A, and the first sound generating device 500 may output first sound having a fundamental frequency F0 of 1 KHz or higher, as illustrated in FIG. 10B. In this case, the second and third sounds have a higher SPL than the first sound in a low frequency band LFR, and the first sound has a higher SPL than the second and third sounds in a high frequency band HFR. Accordingly, in the case of providing sound to the user using the first sound generating device 500 and one of the second and third sound generating devices 930 and 940, SPL can be enhanced in both the low frequency band LFR and the high frequency band HFR, as illustrated in FIG. 10C. That is, the display device 10 can expand the frequency band of sound to be provided to the user and can thus provide richer sound.

Referring again to FIG. 9, in response to a determination being made that the display device 10 is being driven in the mono mode, the main processor 920 may control one of the first, second, and third sound generating devices 500, 930, and 940 to generate and output sound (S106).

For example, the main processor 920 may control only the first sound generating device 500 to generate first sound. Specifically, the main processor 920 may output first sound data to the sound driving circuit 610 via the main circuit board 910, the display circuit board 310, and the sound circuit board 600. The sound driving circuit 610 generates a first sound signal based on the first sound data and outputs the first sound signal to the first sound generating device 500. The first sound generating device 500 may output first sound in accordance with the first sound signal.

In another example, the main processor 920 may control only the second sound generating device 930 to generate second sound. Specifically, the main processor 920 may output second sound data or a second sound signal to the second sound generating device 930. The second sound generating device 930 may output second sound in accordance with a second sound signal generated based on the second sound data or the second sound signal output by the main processor 920.

In another example, the main processor 920 may control only the third sound generating device 940 to generate third sound. Specifically, the main processor 920 may output third sound data or a third sound signal to the third sound generating device 940. The third sound generating device 940 may output third sound in accordance with a third sound signal generated based on the third sound data or the third sound signal output by the main processor 920.

According to the exemplary embodiment of FIG. 9, since in the mono mode, the display device 10 can output sound using one of the first, second, and third sound generating devices 500, 930, and 940, the power consumption of the display device 10 can be reduced in the mono mode than in the stereo mode.

Figure 11A:
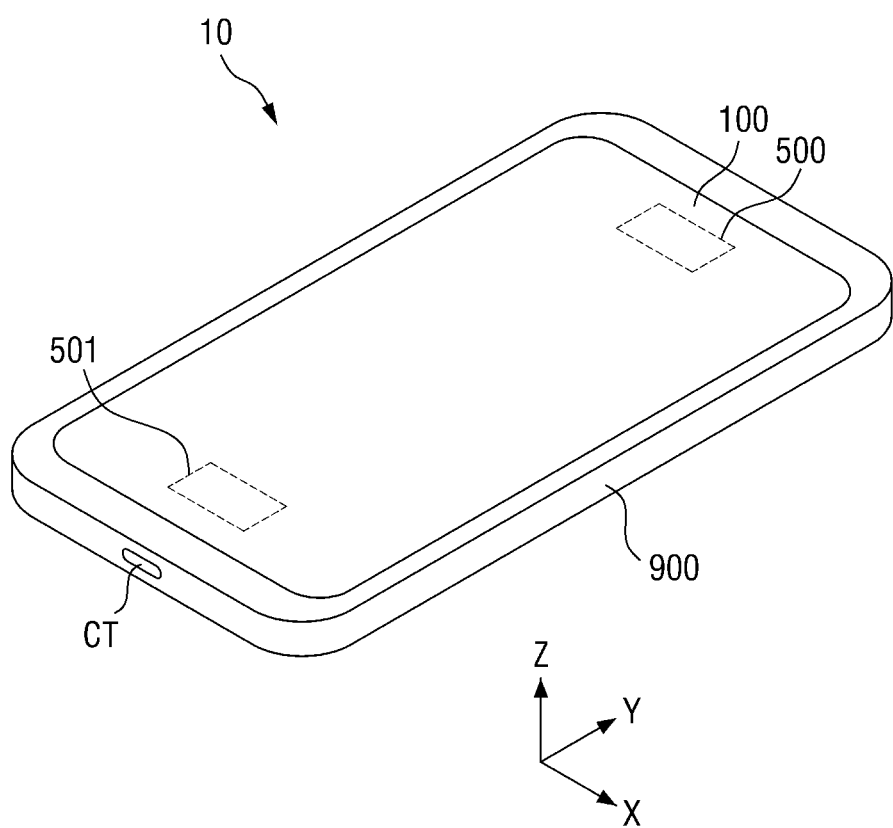
FIGS. 11A and 11B are a perspective view and an exploded perspective view, respectively, of a display device constructed according to another exemplary embodiment of the present disclosure.
Figure 11B:
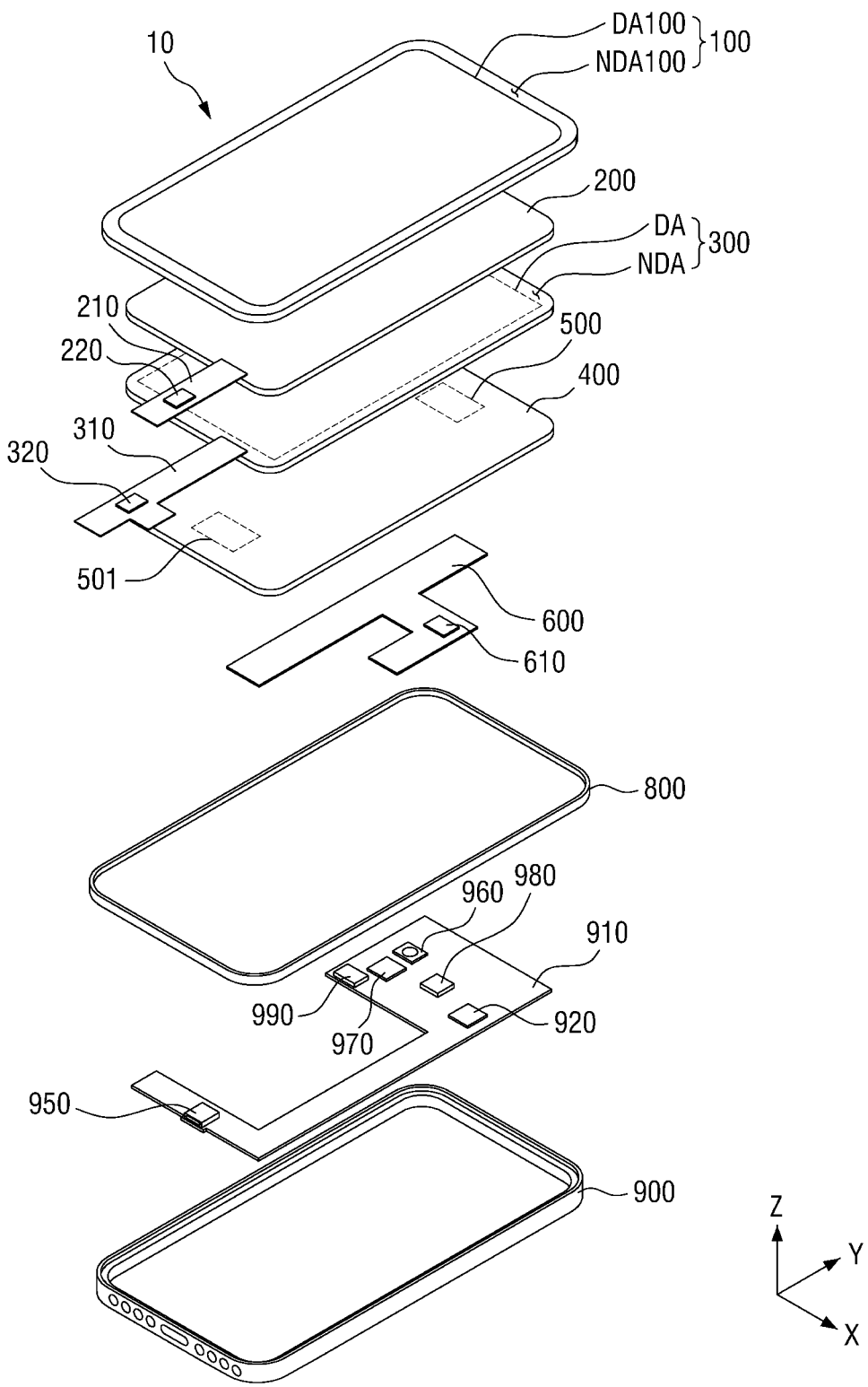
Figure 12:
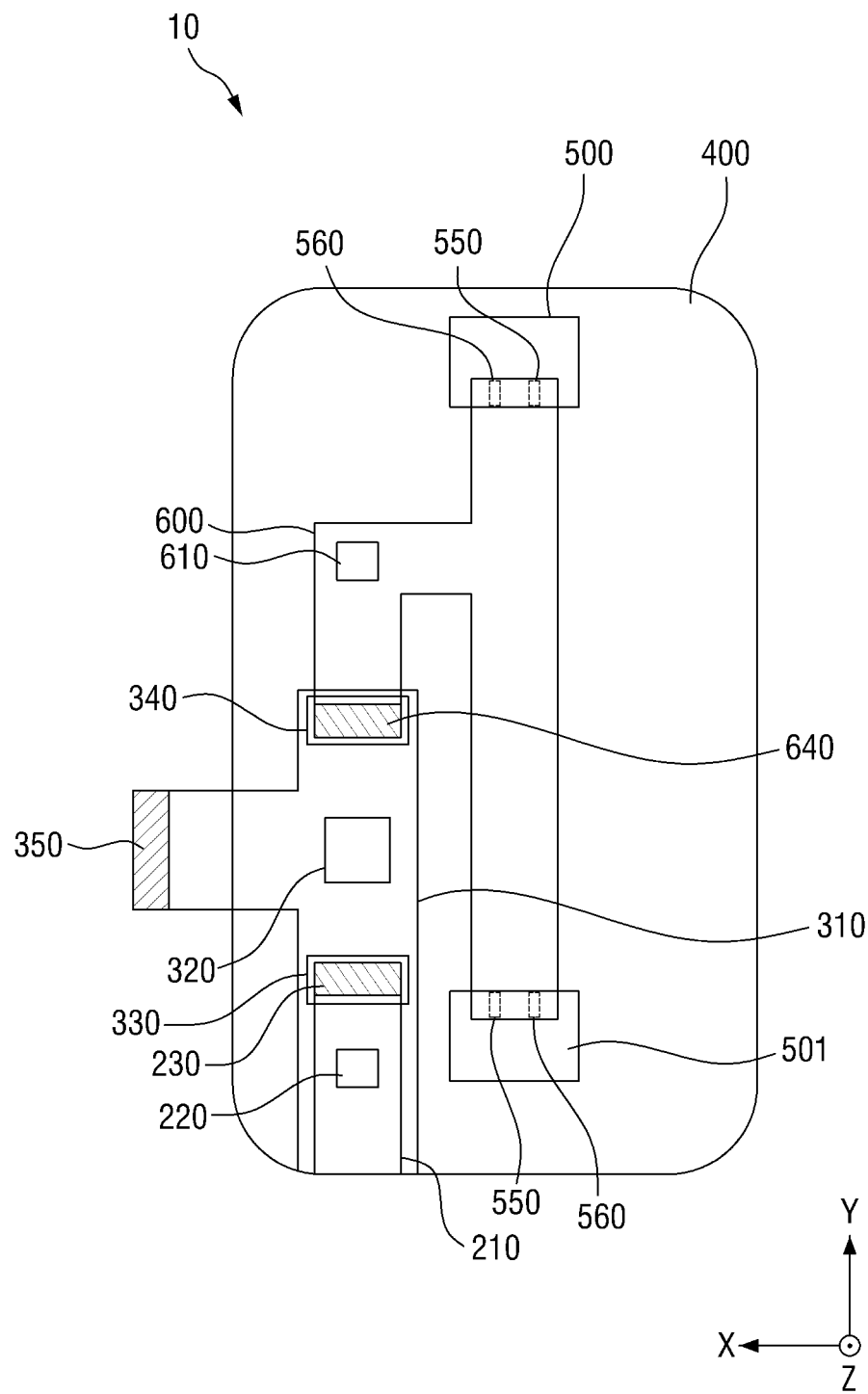
FIG. 12 is a rear view illustrating a display panel, a first sound generating device, a second sound generating device, a sound circuit board, a panel circuit board, and a touch circuit board of the display device of FIGS. 11A and 11B.

FIGS. 11A and 11B are a perspective view and an exploded perspective view, respectively, of a display device constructed according to another exemplary embodiment of the present disclosure. FIG. 12 is a rear view illustrating a display panel, a first sound generating device, a second sound generating device, a sound circuit board, a panel circuit board, and a touch circuit board of the display device of FIGS. 11A and 11B.

A display device 10 of FIGS. 11A and 11B differs from the display device 10 of FIGS. 1A and 1B in that a second sound generating device 501 is implemented as a vibration generating device attached to the bottom surface of a display panel and a third sound generating device 970 is implemented as a vibration generating device mounted on a main circuit board 910. The display device 10 of FIGS. 11A and 11B will hereinafter be described focusing mainly on the differences with the display device 10 of FIGS. 1A and 1B.

Referring to FIGS. 11A and 11B, the second sound generating device 501 may be disposed on the bottom surface of a panel bottom member 400. The second sound generating device 501 may be disposed to be symmetrical with a first sound generating device 500 with respect to the center of a display panel 300. For example, as illustrated in FIGS. 11A and 11B, in a case where the first sound generating device 500 is disposed on one side of the display panel 300, for example, on an upper side of the display panel 300, the second sound generating device 501 may be disposed on the other side of the display panel 300, for example, on a lower side of the display panel 300.

The second sound generating device 501 may be connected to a sound circuit board 600. Specifically, the sound circuit board 600 may be attached to first and second pads 550 and 560 of the second sound generating device 501 via anisotropic conductive films, as illustrated in FIG. 12.

A sound driving circuit 610 may generate a second sound signal in response to second sound data provided by a main processor 920 of the main circuit board 910. In this case, the second sound data may be provided to the main circuit board 910, a display circuit board 310, and the sound circuit board 600, and the second sound signal may be transmitted to the second sound generating device 501 via the sound circuit board 600. The second sound generating device 501 may generate second sound in accordance with the second sound signal.

The second sound generating device 501 may be substantially the same as the first sound generating device 500 of FIGS. 1A and 1B, and thus, a detailed description thereof will be omitted.

In the exemplary embodiment of FIGS. 11A, 11B, and 12, the first and second sound generating devices 500 and 501 are attached to the panel bottom member 400, which is disposed below the display panel 300, and are connected to the sound circuit board 600 having the sound driving circuit 610 mounted thereon, and the sound driving circuit 610 is connected to the display circuit board 310. As a result, the first and second sound generating devices 500 and 501 and the sound circuit board 600 can be incorporated into a single module with the display panel 300.

The third sound generating device 970 may be mounted on the main circuit board 910. The third sound generating device 970 may be a vibration generating device such as an eccentric rotating mass (ERM), a linear resonant actuator (LRA), or a piezoelectric actuator.

The third sound generating device 970 may include a DSP processing third sound data from the main processor 920, a DAC converting the third sound data into a third sound signal, which is an analog signal, an amplifier amplifying and outputting the third sound signal, and a vibration generator generating vibration in accordance with the third sound signal. Also, the third sound generating device 970 may receive the third sound signal directly from the main processor 920 or a separate sound driving circuit, in which case, the third sound generating device 970 may include only the vibration generator. The third sound generating device 970 may vibrate in accordance with the third sound signal and may thus provide third sound.

The third sound generating device 970 not only provides the third sound, but also generates various patterns of vibration so as for a user who uses the display device 10 to receive various haptic feedback. In this case, a haptic signal may be included in the third sound signal.

In the exemplary embodiment of FIGS. 11A and 11B, since the first and second sound generating devices 500 and 501 are implemented as vibration generating devices and are attached to the bottom surface of the display panel 300 and the third sound generating device 970 is implemented as a vibration generating device and is attached to the main circuit board 910, the display device 10 can output sound using sound generating devices that are not exposed to the outside. Accordingly, any sound generating devices can be eliminated from the front of the display device 10, and as a result, a light-transmitting portion DA100 of a cover window 100 can be widened. Also, since speaker holes that may be formed on a side of a lower cover 900 of the display device 10 can be eliminated, the waterproof and dustproof characteristics of the display device 10 can be improved.

Figure 13:
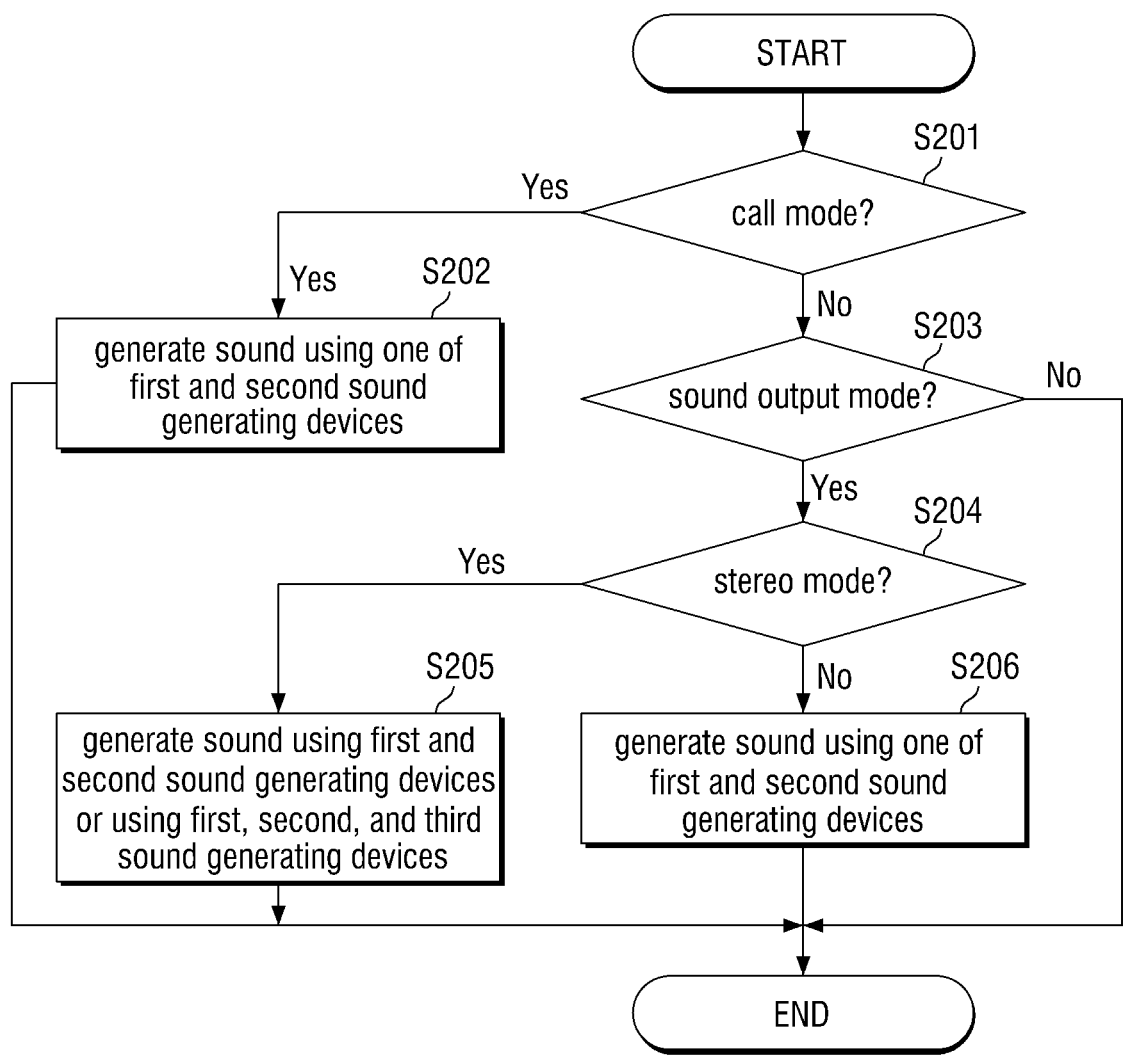
FIG. 13 is a flowchart illustrating a method of driving a display device constructed according to another exemplary embodiment of the present disclosure.
Figure 14A:
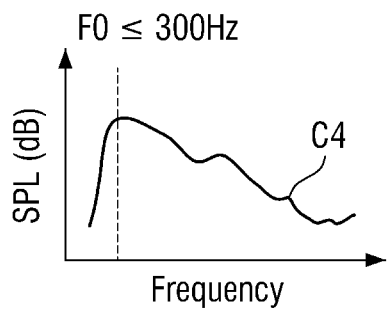
FIGS. 14A, 14B, and 14C are graphs showing the SPLs vs frequency of the first and third sound generating devices of the display device of FIGS. 11A and 11B and the assembly of the first and third sound generating devices of the display device of FIGS. 11A and 11B, respectively.
Figure 14B:
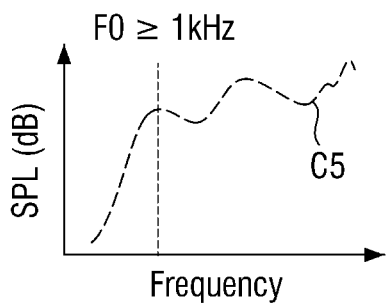
Figure 14C:
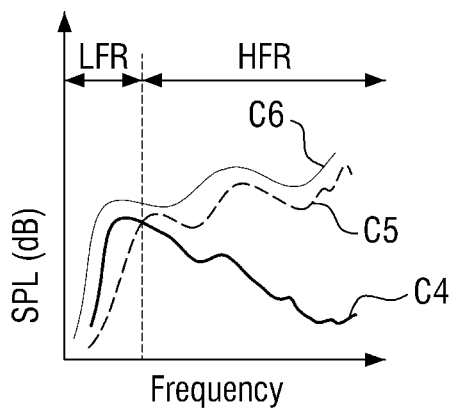

FIG. 13 is a flowchart illustrating a method of driving a display device constructed according to another exemplary embodiment of the present disclosure. FIGS. 14A, 14B, and 14C are graphs showing the SPLs vs frequency of the first and third sound generating devices of the display device of FIGS. 11A and 11B and the assembly of the first and third sound generating devices of the display device of FIGS. 11A and 11B, respectively.

An exemplary sound output method of the display device 10 of FIGS. 11A and 11B, which includes the first, second, and third sound generating devices 500, 501, and 970, will hereinafter be described with reference to FIG. 13.

Referring to FIG. 13, the main processor 920 determines whether the display device 10 is being driven in the call mode (S201).

Thereafter, in response to a determination being made that the display device 10 is being driven in the call mode, the main processor 920 generates first sound or second sound using the first sound generating device 500 or the second sound generating device 501 and controls the other party's voice received via a mobile communication module to be output (S202).

Specifically, the main processor 920 outputs first sound data corresponding to the other party's voice received via the mobile communication module to the sound driving circuit 610 via the main circuit board 910, the display circuit board 310, and the sound circuit board 600. The sound driving circuit 610 generates a first sound signal based on the first sound data and outputs the first sound signal to the first sound generating device 500 via the sound driving circuit 610. Accordingly, the first sound generating device 500 can output the first sound in accordance with the first sound signal.

Also, the main processor 920 outputs second sound data corresponding to the other party's voice received via the mobile communication module to the sound driving circuit 610 via the main circuit board 910, the display circuit board 310, and the sound circuit board 600. The sound driving circuit 610 generates a second sound signal based on the second sound data and outputs the second sound signal to the second sound generating device 501 via the sound driving circuit 610. Accordingly, the second sound generating device 501 can output the second sound in accordance with the second sound signal.

That is, the display device 10 can output sound using sound generating devices that are not exposed to the outside. Accordingly, any sound generating devices can be eliminated from the front of the display device 10, and as a result, the light-transmitting portion DA100 of the cover window 100 can be widened.

The main processor 920 determines whether the display device 10 is being driven in the sound output mode (S203).

Thereafter, in response to a determination being made that the display device 10 is being driven in the sound output mode, the main processor 920 determines whether the display device 10 is being driven in the stereo mode or the mono mode (S204).

Thereafter, in response to a determination being made that the display device 10 is being driven in the stereo mode, the main processor 920 controls sound to be generated and output via the first and second sound generating devices 500 and 501 or via the first, second, and third sound generating devices 500, 501, and 970 (S205).

For example, the main processor 920 may control the first and second sound generating devices 500 and 501 to generate first and second sounds and may thus provide stereo sound of 2 channels to the user. Specifically, the main processor 920 outputs first sound data and second sound data to the sound driving circuit 610 via the main circuit board 910, the display circuit board 310, and the sound circuit board 600. The sound driving circuit 610 generates first and second sound signals based on the first and second sound data, respectively, and outputs the first and second sound signals to the first and second sound generating devices 500 and 501, respectively. The first sound generating device 500 may output first sound in accordance with the first sound signal. The second sound generating device 501 may output second sound in accordance with the second sound signal.

Also, the main processor 920 may control the first, second, and third sound generating devices 500, 501, and 970 to generate first sound, second sound, and third sound and may thus provide stereo sound of 2.1 channels to the user. In this case, the third sound generating device 970 may serve as a woofer for outputting low sound. Specifically, the main processor 920 may output first sound data and second sound data to the sound driving circuit 610 via the main circuit board 910, the display circuit board 310, and the sound circuit board 600 and may output third sound data or a third sound signal to the third sound generating device 970. The sound driving circuit 610 generates first and second sound signals based on the first and second sound data, respectively, and outputs the first and second sound signals to the first and second sound generating devices 500 and 501, respectively. The first sound generating device 500 may output first sound in accordance with the first sound signal. The second sound generating device 501 may output second sound in accordance with the second sound signal. The third sound generating device 970 may output third sound in accordance with a third sound signal generated based on the third sound data or the third sound signal output by the main processor 920.

Particularly, in a case where the fundamental frequencies F0 of the first and second sound generating devices 500 and 501 are controlled differently from the fundamental frequency F0 of the third sound generating device 970, as indicated by curves C4 and C5 of FIGS. 14A and 14B, the frequency band of sound to be provided to the user can be expanded, as indicated by a curve C6 of FIG. 14C, and richer sound can be provided to the user. Referring to FIGS. 14A, 14B, and 14C, the X axis represents resonant frequency, the Y axis represents SPL, and F0 denotes the minimum frequency at which the displacement of the diaphragm of each sound generating device becomes greater than a reference displacement.

Specifically, the third sound generating device 970 may output third sound having a fundamental frequency F0 of 300 MHz, as illustrated in FIG. 14A, and the first and second sound generating devices 500 and 501 may output first and second sounds having a fundamental frequency F0 of 1 KHz or higher, as illustrated in FIG. 14B. In this case, the third sound has a higher SPL than the first and second sounds in a low frequency band LFR, and the first and second sounds have a higher SPL than the third sound in a high frequency band HFR. Accordingly, in the case of providing sound to the user using the first, second, and third sound generating devices 500, 501, and 970, SPL can be enhanced in both the low frequency band LFR and the high frequency band HFR, as illustrated in FIG. 14C. That is, the display device 10 can expand the frequency band of sound to be provided to the user and can thus provide richer sound.

Stereo sound of 2 or more channels can be provided using one of the first and second sound generating devices 500 and 501 and using the third sound generating device 970. Since the fundamental frequency F0 of the third sound generating device 970 is lower than 300 MHz, the third sound generating device 970 may be suitable for use as a woofer for outputting low sound. Accordingly, when the third sound generating device 970 is used, stereo sound of 2.1 channels, rather than stereo sound of 2 channels, may preferably be provided to the user.

Referring again to FIG. 13, in response to a determination being made that the display device 10 is being driven in the mono mode, the main processor 920 may control one of the first and second sound generating devices 500 and 501 to generate and output sound (S206).

For example, the main processor 920 may control only the first sound generating device 500 to generate first sound. Specifically, the main processor 920 may output first sound data to the sound driving circuit 610 via the main circuit board 910, the display circuit board 310, and the sound circuit board 600. The sound driving circuit 610 generates a first sound signal based on the first sound data and outputs the first sound signal to the first sound generating device 500. The first sound generating device 500 may output first sound in accordance with the first sound signal.

In another example, the main processor 920 may control only the second sound generating device 501 to generate second sound. Specifically, the main processor 920 may output second sound data to the sound driving circuit 610 via the main circuit board 910, the display circuit board 310, and the sound circuit board 600. The sound driving circuit 610 generates a second sound signal based on the second sound data and outputs the second sound signal to the second sound generating device 501. The second sound generating device 501 may output second sound in accordance with the second sound signal.

The mono mode can also be realized using the third sound generating device 970. However, since the fundamental frequency F0 of the third sound generating device 970 is lower than 300 MHz, the third sound generating device 970 may be suitable for use as a woofer for outputting low sound. Accordingly, when the third sound generating device 970 is used, stereo sound of 2.1 channels in the stereo mode, rather than mono sound, may preferably be provided to the user.

According to the exemplary embodiment of FIG. 13, since in the mono mode, the display device 10 can output sound using one of the first and second sound generating devices 500 and 501, the power consumption of the display device 10 can be reduced in the mono mode than in the stereo mode.

Figure 15:
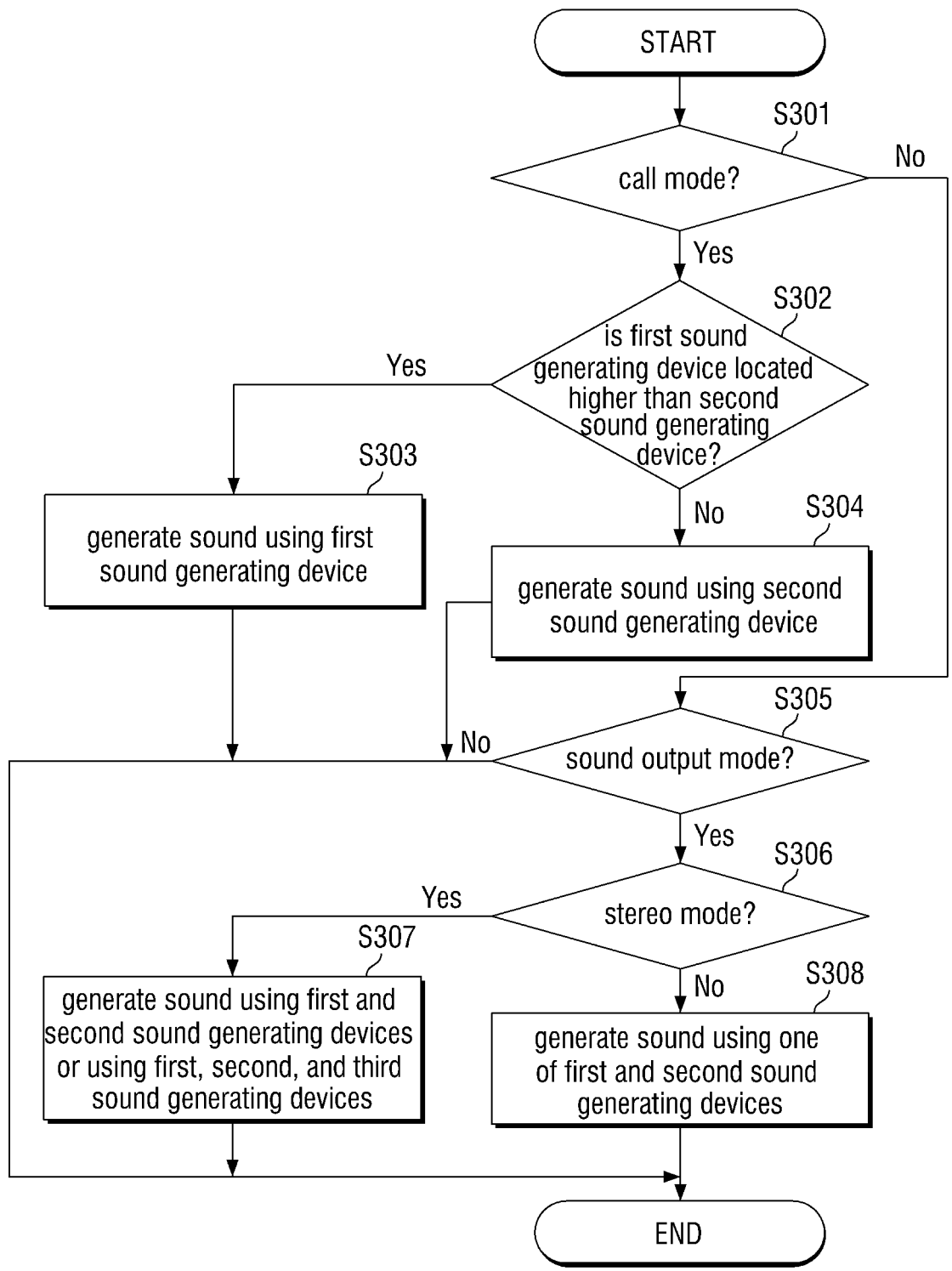
FIG. 15 is a flowchart illustrating a method of driving a display device constructed according to another exemplary embodiment of the present disclosure.
Figure 16A:
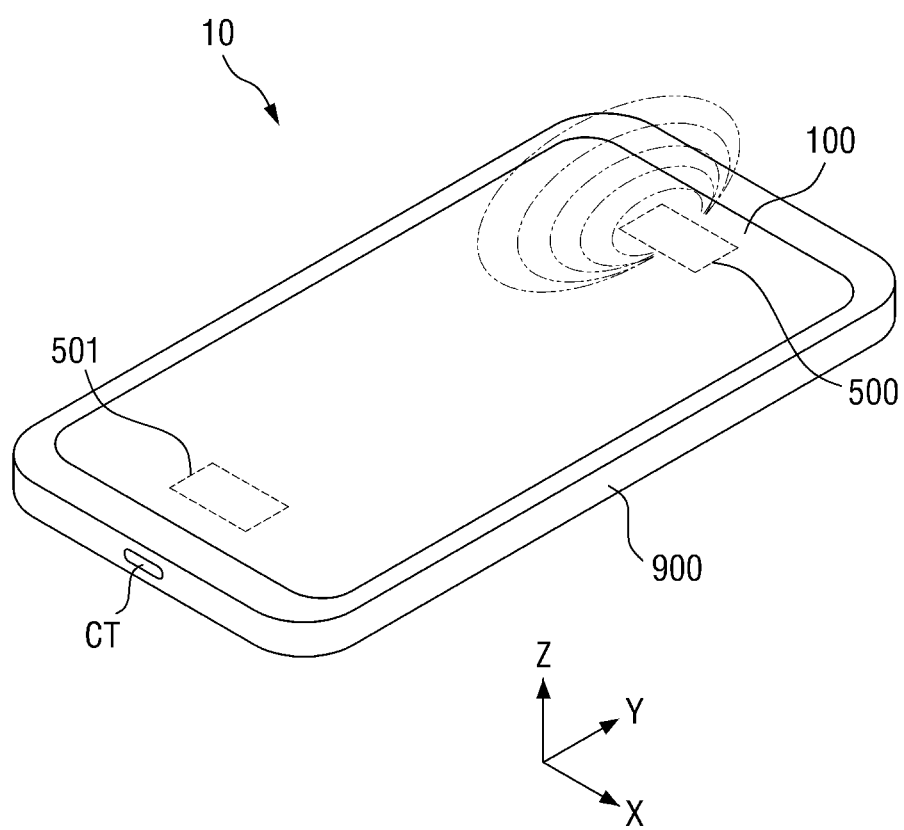
FIGS. 16A and 16B are schematic views illustrating a display device in which a first sound generating device is located higher than a second sound generating device and a display device in which a second sound generating device is located higher than a first sound generating device, respectively.
Figure 16B:
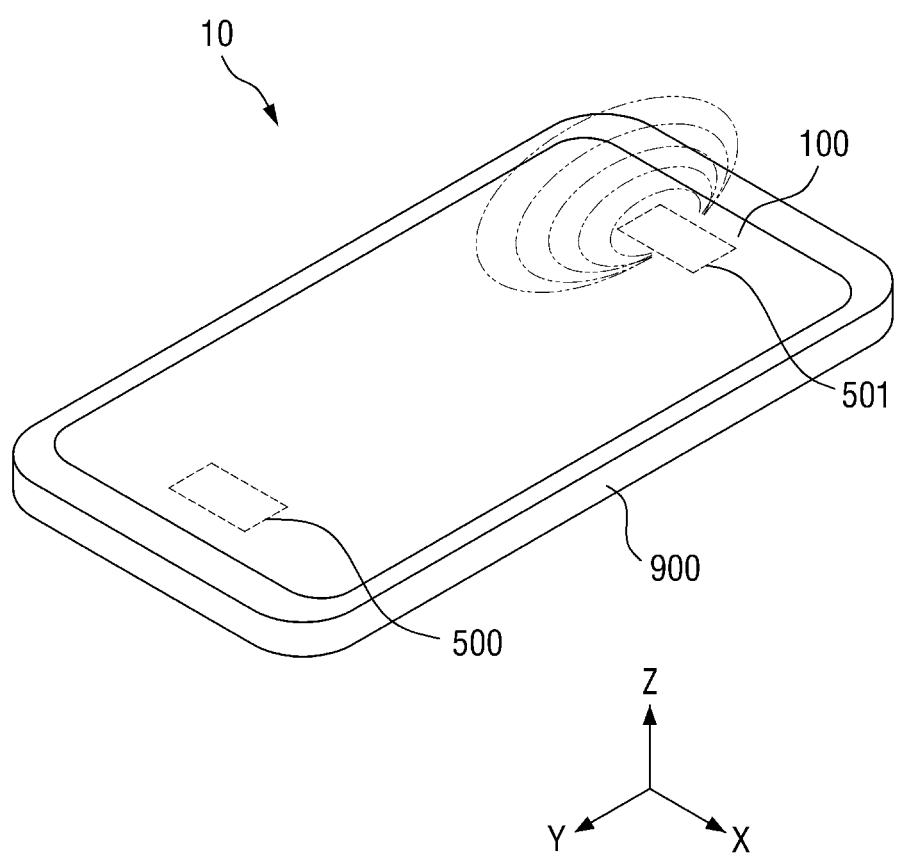
Figure 17A:
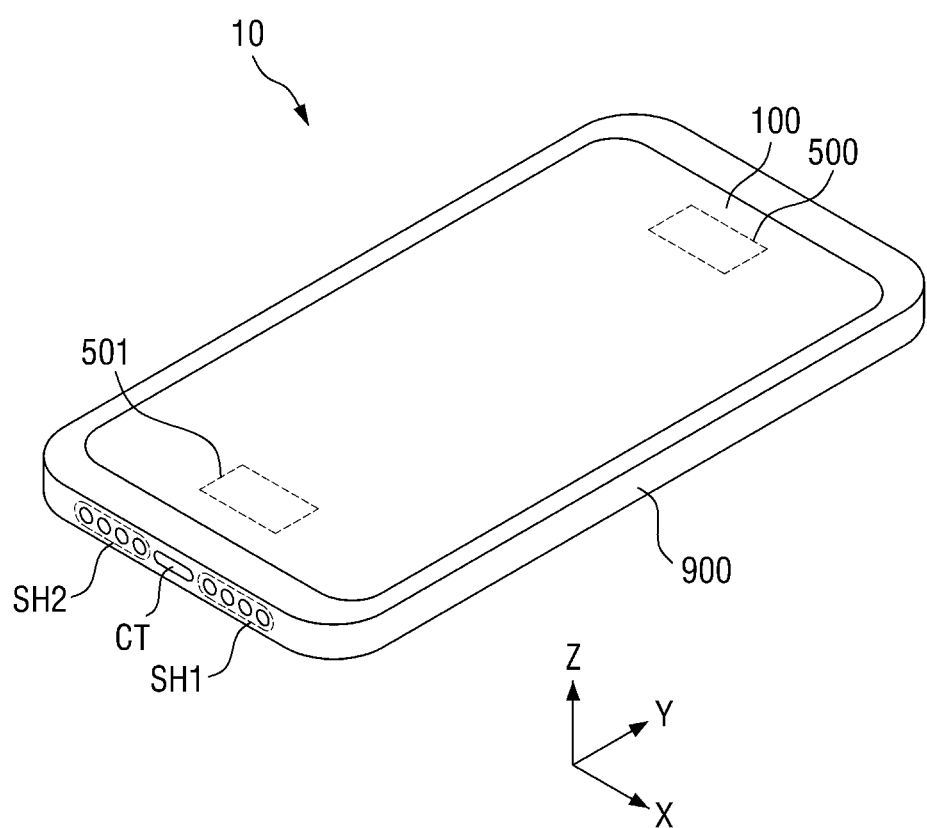
FIG. 17A is a perspective view of a display device constructed according to another exemplary embodiment of the present disclosure.
Figure 17B:
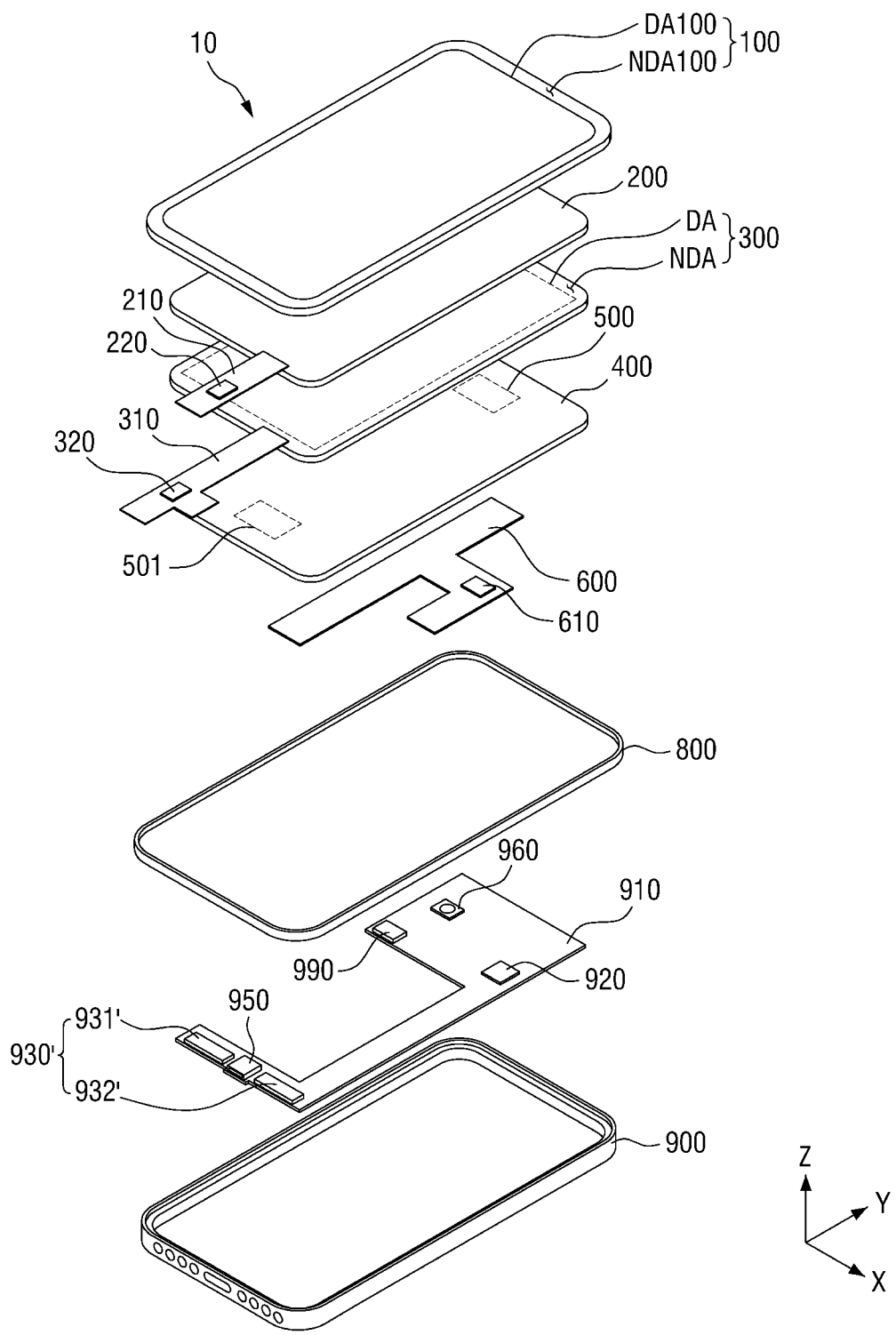
FIGS. 17B and 17C are exploded perspective views of the display device of FIG. 17A.
Figure 17C:
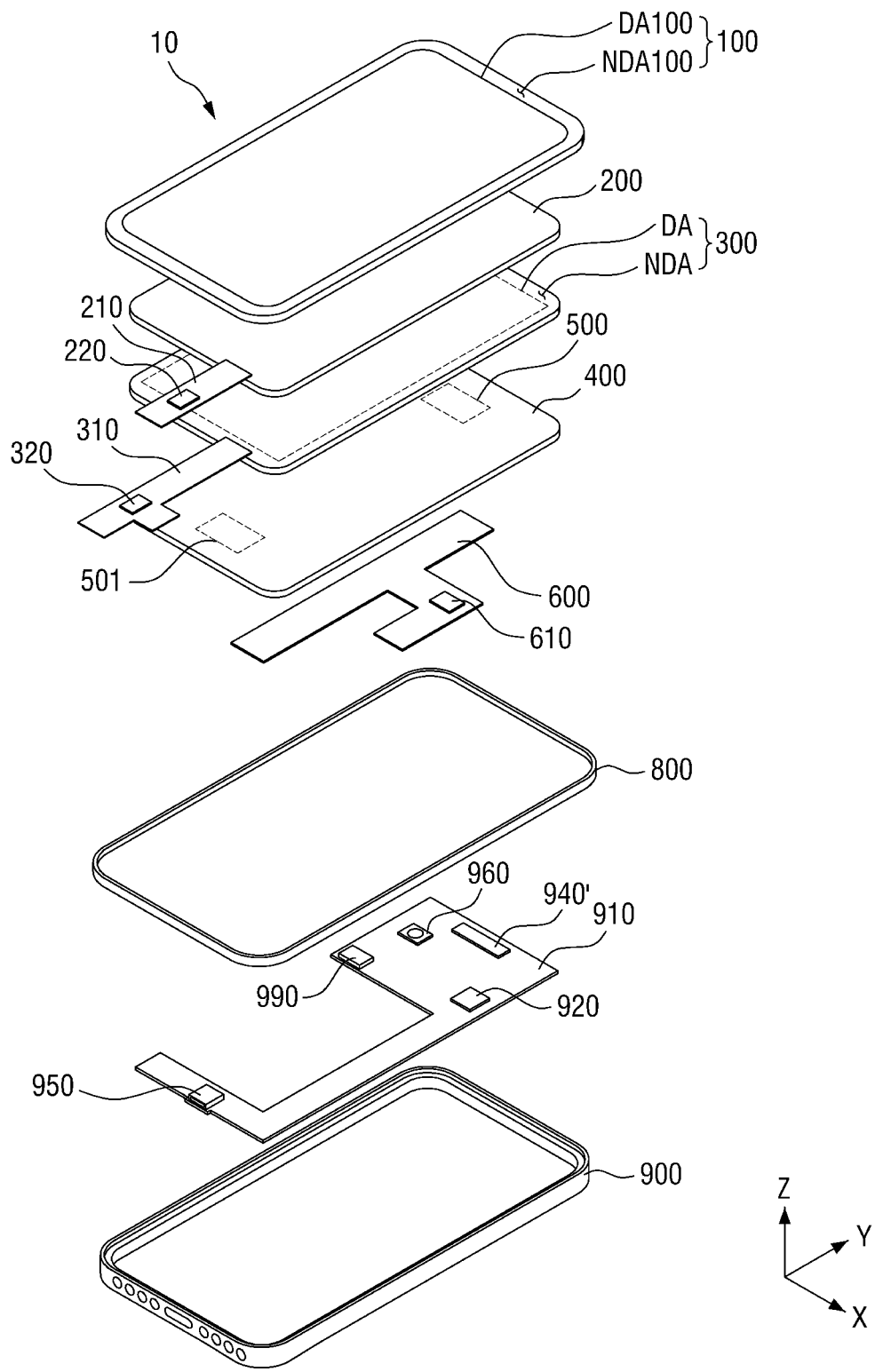

FIG. 15 is a flowchart illustrating a method of driving a display device according to another exemplary embodiment of the present disclosure. FIGS. 16A and 16B are schematic views illustrating a display device in which a first sound generating device 500 is located higher than a second sound generating device 501 and a display device in which a second sound generating device 501 is located higher than a first sound generating device 500, respectively. FIG. 17A is a perspective view of a display device 10 constructed according to another exemplary embodiment of the present disclosure. FIGS. 17B and 17C are exploded perspective views of the display device 10 of FIG. 17A.

Another exemplary sound output method of the display device 10 of FIGS. 11A and 11B, which includes the first, second, and third sound generating devices 500, 501, and 970, will hereinafter be described with reference to FIG. 15.

Referring to FIG. 15, the main processor 920 determines whether the display device 10 is being driven in the call mode (S301).

Thereafter, in response to a determination being made that the display device 10 is being driven in the call mode, the main processor 920 determines whether the first sound generating device 500 is located higher than the second sound generating device 501 (S302).

Referring to FIG. 11B, a gyro sensor 980 may be mounted on the main circuit board 910, and the main processor 920 may determine the degree to which the display device 10 is tilted using the gyro sensor 980. Accordingly, the main processor 920 can determine which of the first and second sound generating devices 500 and 501 is located higher.

Referring to FIG. 16A, when the first sound generating device 500 is located higher than the second sound generating device 501, the ear of the user may generally be placed closer to the first sound generating device 500 than to the second sound generating device 501. Accordingly, in response to a determination being made that the first sound generating device 500 is located higher than the second sound generating device 501, as illustrated in FIG. 16A, the main processor 920 generates first sound using the first sound generating device 500 and thus controls the other party's voice received via the mobile communication module to be output (S303).

Specifically, the main processor 920 outputs first sound data corresponding to the other party's voice received via the mobile communication module to the sound driving circuit 610 via the main circuit board 910, the display circuit board 310, and the sound circuit board 600. The sound driving circuit 610 generates a first sound signal based on the first sound data and outputs the first sound signal to the first sound generating device 500 via the sound driving circuit 610. Accordingly, the first sound generating device 500 can output the first sound in accordance with the first sound signal.

On the other hand, referring to FIG. 16B, when the second sound generating device 501 is located higher than the first sound generating device 500, the ear of the user may generally be placed closer to the second sound generating device 501 than to the first sound generating device 500. Thus, in response to a determination being made that the second sound generating device 501 is located higher than the first sound generating device 500, as illustrated in FIG. 16B, the main processor 920 generates second sound using the second sound generating device 501 and thus controls the other party's voice received via the mobile communication module to be output (S304).

Specifically, the main processor 920 outputs second sound data corresponding to the other party's voice received via the mobile communication module to the sound driving circuit 610 via the main circuit board 910, the display circuit board 310, and the sound circuit board 600. The sound driving circuit 610 generates a second sound signal based on the second sound data and outputs the second sound signal to the second sound generating device 501 via the sound driving circuit 610. Accordingly, the second sound generating device 501 can output the second sound in accordance with the second sound signal.

According to the exemplary embodiment of FIG. 15, since a determination can be made as to which of the first and second sound generating devices 500 and 501 is located higher than based on the degree to which the display device 10 is tilted using the gyro sensor 980, sound can be provided using whichever of the first and second sound generating devices 500 and 501 is determined to be closer to the ear of the user. Accordingly, the user can be provided with sound at an optimum location regardless of the degree to which the display device 10 is tilted.

S305, S306, S307, and S308 of FIG. 15 are substantially the same as S203, S204, S205, and S206, respectively, of FIG. 13, and thus, detailed descriptions thereof will be omitted.

FIG. 17A is a perspective view of a display device according to another exemplary embodiment of the present disclosure. FIGS. 17B and 17C are exploded perspective views of the display device of FIG. 17A.

A display device 10 of FIGS. 17A, 17B, and 17C differs from the display device 10 of FIGS. 1A and 1B in that a second sound generating device 501 is implemented as a vibration generating device attached to the bottom surface of a display panel 300 and a third sound generating device 930' or 940' is implemented as a speaker device mounted on a main circuit board 910. The display device 10 of FIGS. 17A, 17B, and 17C will hereinafter be described focusing mainly on the differences with the display device 10 of FIGS. 1A and 1B.

Referring to FIGS. 17A, 17B, and 17C, the second sound generating device 501 may be disposed on the bottom surface of a panel bottom member 400. The second sound generating device 501 may be disposed to be symmetrical with a first sound generating device 500 with respect to the center of the display panel 300. For example, as illustrated in FIGS. 17A, 17B, and 17C, in a case where the first sound generating device 500 is disposed on one side of the display panel 300, for example, on an upper side of the display panel 300, the second sound generating device 501 may be disposed on the other side of the display panel 300, for example, on a lower side of the display panel 300.

The second sound generating device 501 may be connected to a sound circuit board 600. Specifically, the sound circuit board 600 may be attached to first and second pads 550 and 560 of the second sound generating device 501 via anisotropic conductive films, as illustrated in FIG. 12.

A sound driving circuit 610 may generate a second sound signal in response to second sound data provided by a main processor 920 of the main circuit board 910. In this case, the second sound data may be provided to the main circuit board 910, a display circuit board 310, and the sound circuit board 600, and the second sound signal may be transmitted to the second sound generating device 501 via the sound circuit board 600. The second sound generating device 501 may generate second sound in accordance with the second sound signal.

The second sound generating device 501 may be substantially the same as the first sound generating device 500 of FIGS. 1A and 1B, and thus, a detailed description thereof will be omitted.

In the exemplary embodiment of FIGS. 17A, 17B, and 17C, the first and second sound generating devices 500 and 501 are attached to the panel bottom member 400, which is disposed below the display panel 300, and are connected to the sound circuit board 600 having the sound driving circuit 610 mounted thereon, and the sound driving circuit 610 is connected to the display circuit board 310. As a result, the first and second sound generating devices 500 and 501 and the sound circuit board 600 can be incorporated into a single module with the display panel 300.

The third sound generating device 930' or 940' may be a speaker mounted on the main circuit board 910. Specifically, the third sound generating device 930' or 940' may include a DSP processing third sound data from the main processor 920, a DAC converting the third sound data into a third sound signal, which is an analog signal, an amplifier amplifying and outputting the third sound signal, and a sound output portion outputting third sound in accordance with the third sound signal. Also, the third sound generating device 930' or 940' may receive the third sound signal directly from the main processor 920, in which case, the third sound generating device 930' or 940' may include only the sound output portion.

The third sound generating device 930' may be disposed on a lower side of the main circuit board 910, as illustrated in FIG. 17B. In this case, the third sound generating device 930' may provide the second sound, from one side of the display device 10, via speaker holes SH1 and SH2 disposed on a lower side of a lower cover 900. Also, the third sound generating device 940' may be disposed on an upper side of the main circuit board 910, as illustrated in FIG. 17C. In this case, the third sound generating device 940' may provide the second sound, from one side of the display device 10, via speaker holes disposed on an upper side of the lower cover 900.

The third sound generating device 930' may include first and second sub-sound generating devices 931' and 932', which are disposed on opposite sides of a charging terminal 950, but the exemplary embodiments are not limited thereto. In another example, the third sound generating device 930' may be disposed on only one side of the charging terminal 950. In yet another example, the charging terminal 950 may be disposed at a location where one of the first and second sub-sound generating devices 931' and 932' is disposed, and the other sub-sound generating device may be disposed at a location where the charging terminal 950 is not disposed.

Figure 18:
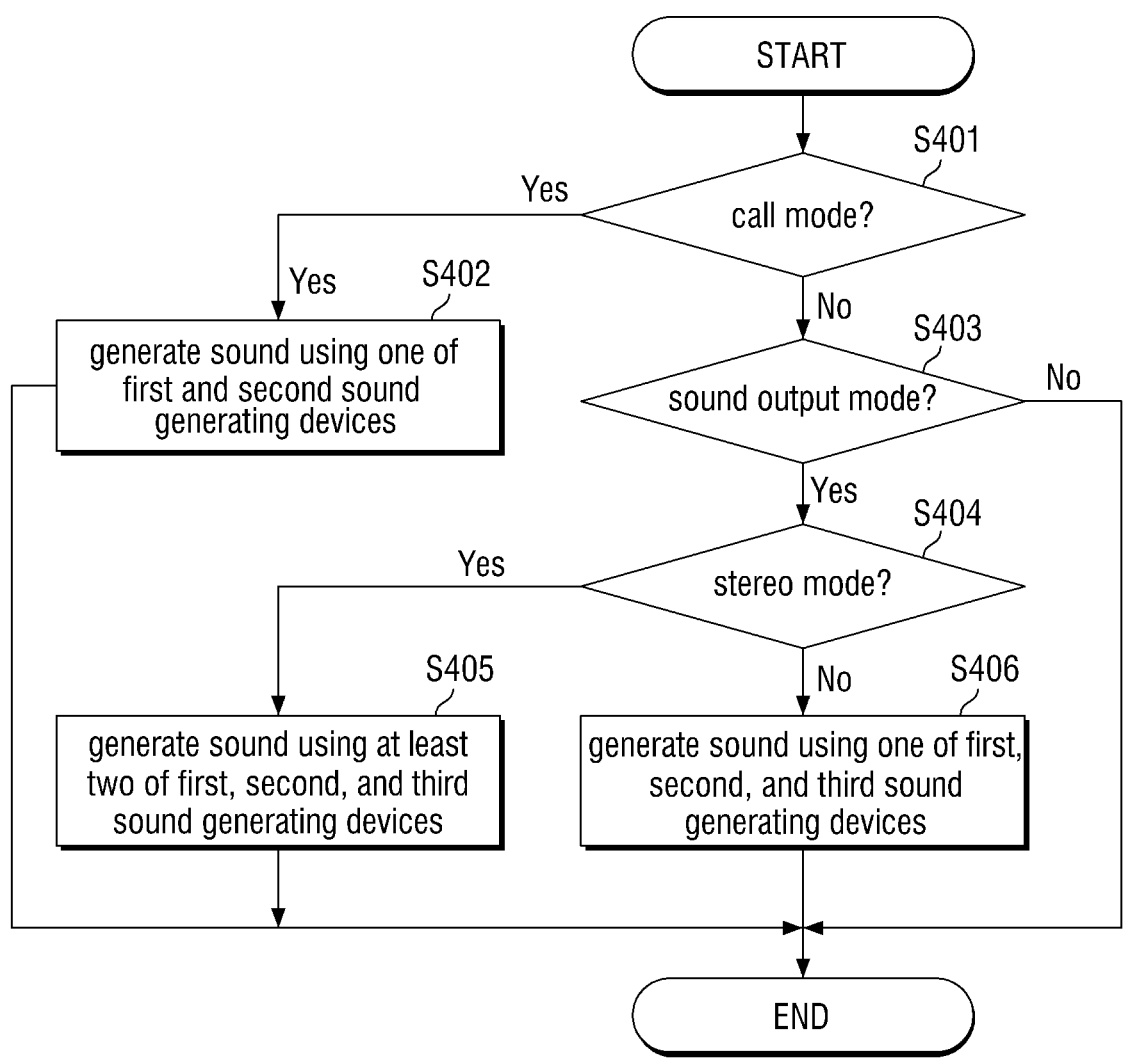
FIG. 18 is a flowchart illustrating a method of driving a display device constructed according to another exemplary embodiment of the present disclosure.

FIG. 18 is a flowchart illustrating a method of driving a display device according to another exemplary embodiment of the present disclosure.

An exemplary sound output method of the display device 10 of FIGS. 17A, 17B, and 17C, which includes the first, second, and third sound generating devices 500, 501, and 930' or 940', will hereinafter be described with reference to FIG. 18.

S401 and S402 of FIG. 18 are substantially the same as S201 and S202, respectively, of FIG. 13. Also, S401 and S402 of FIG. 18 may be replaced with S301 through S304 of FIG. 15. Accordingly, detailed descriptions of S401 and S402 of FIG. 18 will be omitted.

Referring to FIG. 18, the main processor 920 determines whether the display device 10 is being driven in the sound output mode (S403).

Thereafter, in response to a determination being made that the display device 10 is being driven in the sound output mode, the main processor 920 determines whether the display device 10 is being driven in the stereo mode or the mono mode (S404).

Thereafter, in response to a determination being made that the display device 10 is being driven in the stereo mode, the main processor 920 controls sound to be generated and output via at least two of the first, second, and third sound generating devices 500, 501, and 930' or 940' (S405).

For example, the main processor 920 may control the first and second sound generating devices 500 and 501 to generate first and second sounds and may thus provide stereo sound of 2 channels to the user. Specifically, the main processor 920 outputs first and second sound data to the sound driving circuit 610 via the main circuit board 910, the display circuit board 310, and the sound circuit board 600. The sound driving circuit 610 generates first and second sound signals based on the first and second sound data, respectively, and outputs the first and second sound signals to the first and second sound generating devices 500 and 501, respectively. The first sound generating device 500 may output first sound in accordance with the first sound signal.

The second sound generating device 501 may output second sound in accordance with the second sound signal.

Also, the main processor 920 may control the first and third sound generating devices 500 and 930' or 940' to generate first and third sounds and may thus provide stereo sound of 2 channels to the user. Specifically, the main processor 920 may output first sound data to the sound driving circuit 610 via the main circuit board 910, the display circuit board 310, and the sound circuit board 600 and may output third sound data or a third sound signal to the third sound generating device 930' or 940'. The sound driving circuit 610 generates a first sound signal based on the first sound data and outputs the first sound signal to the first sound generating device 500. The first sound generating device 500 may output first sound in accordance with the first sound signal. The third sound generating device 930' or 940' may output third sound in accordance with a third sound signal generated based on the third sound data or the third sound signal output by the main processor 920.

Also, the main processor 920 may control the second and third sound generating devices 501 and 930' or 940' to generate second and third sounds and may thus provide stereo sound of 2 channels to the user. Specifically, the main processor 920 may output second sound data to the sound driving circuit 610 via the main circuit board 910, the display circuit board 310, and the sound circuit board 600 and may output third sound data or a third sound signal to the third sound generating device 930' or 940'. The sound driving circuit 610 generates a second sound signal based on the second sound data and outputs the second sound signal to the second sound generating device 501. The second sound generating device 501 may output second sound in accordance with the second sound signal. The third sound generating device 930' or 940' may output third sound in accordance with a third sound signal generated based on the third sound data or the third sound signal output by the main processor 920.

Also, the main processor 920 may control the first, second, and third sound generating devices 500, 501, and 930' or 940' to generate first sound, second sound, and third sound and may thus provide stereo sound of 2.1 channels to the user. In this case, the third sound generating device 930' or 940' may serve as a woofer for outputting low sound. Specifically, the main processor 920 may output first sound data and second sound data to the sound driving circuit 610 via the main circuit board 910, the display circuit board 310, and the sound circuit board 600 and may output third sound data or a third sound signal to the third sound generating device 930' or 940'. The sound driving circuit 610 generates first and second sound signals based on the first and second sound data, respectively, and outputs the first and second sound signals to the first and second sound generating devices 500 and 501, respectively. The first sound generating device 500 may output first sound in accordance with the first sound signal. The second sound generating device 501 may output second sound in accordance with the second sound signal. The third sound generating device 930' or 940' may output third sound in accordance with a third sound signal generated based on the third sound data or the third sound signal output by the main processor 920.

Particularly, in a case where the fundamental frequency F0 of the first or second sound generating device 500 or 501 is controlled differently from the fundamental frequency F0 of the third sound generating device 930' or 940', as indicated by the curves C1 and C2 of FIGS. 10A and 10B, the frequency band of sound to be provided to the user can be expanded, as indicated by the curve C3 of FIG. 10C, and richer sound can be provided to the user. Referring to FIGS. 10A, 10B, and 10C, the X axis represents resonant frequency, the Y axis represents sound pressure level (SPL), and F0 denotes the minimum frequency at which the displacement of the diaphragm of each sound generating device becomes greater than a reference displacement.

Specifically, the third sound generating device 930' or 940' may output third sound having a fundamental frequency F0 of 800 MHz, as illustrated in FIG. 10A, and the first and second sound generating devices 500 and 501 may output first and second sounds having a fundamental frequency F0 of 1 KHz or higher, as illustrated in FIG. 10B. In this case, the third sound has a higher SPL than the first and second sounds in a low frequency band LFR, and the first and second sounds have a higher SPL than the third sound in a high frequency band HFR. Accordingly, in the case of providing sound to the user using the first, second, and third sound generating devices 500, 501, and 930' or 940', SPL can be enhanced in both the low frequency band LFR and the high frequency band HFR, as illustrated in FIG. 10C. That is, the display device 10 can expand the frequency band of sound to be provided to the user and can thus provide richer sound.

Referring again to FIG. 18, in response to a determination being made that the display device 10 is being driven in the mono mode, the main processor 920 may control one of the first, second, and third sound generating devices 500, 501, and 930' or 940' to generate and output sound (S406).

For example, the main processor 920 may control only the first sound generating device 500 to generate first sound. Specifically, the main processor 920 may output first sound data to the sound driving circuit 610 via the main circuit board 910, the display circuit board 310, and the sound circuit board 600. The sound driving circuit 610 generates a first sound signal based on the first sound data and outputs the first sound signal to the first sound generating device 500. The first sound generating device 500 may output first sound in accordance with the first sound signal.

In another example, the main processor 920 may control only the second sound generating device 501 to generate second sound. Specifically, the main processor 920 may output second sound data to the sound driving circuit 610 via the main circuit board 910, the display circuit board 310, and the sound circuit board 600. The sound driving circuit 610 generates a second sound signal based on the second sound data and outputs the second sound signal to the second sound generating device 501. The second sound generating device 501 may output second sound in accordance with the second sound signal.

In another example, the main processor 920 may control only the third sound generating device 930' or 940' to generate third sound. Specifically, the main processor 920 may output third sound data or a third sound signal to the third sound generating device 930' or 940'. The third sound generating device 930' or 940' may output third sound in accordance with a third sound signal generated based on the third sound data or the third sound signal output by the main processor 920.

According to the exemplary embodiment of FIG. 18, since in the mono mode, the display device 10 can output sound using one of the first, second, and third sound generating devices 500, 501, and 930' or 940', the power consumption of the display device 10 can be reduced in the mono mode than in the stereo mode.

Figure 19A:
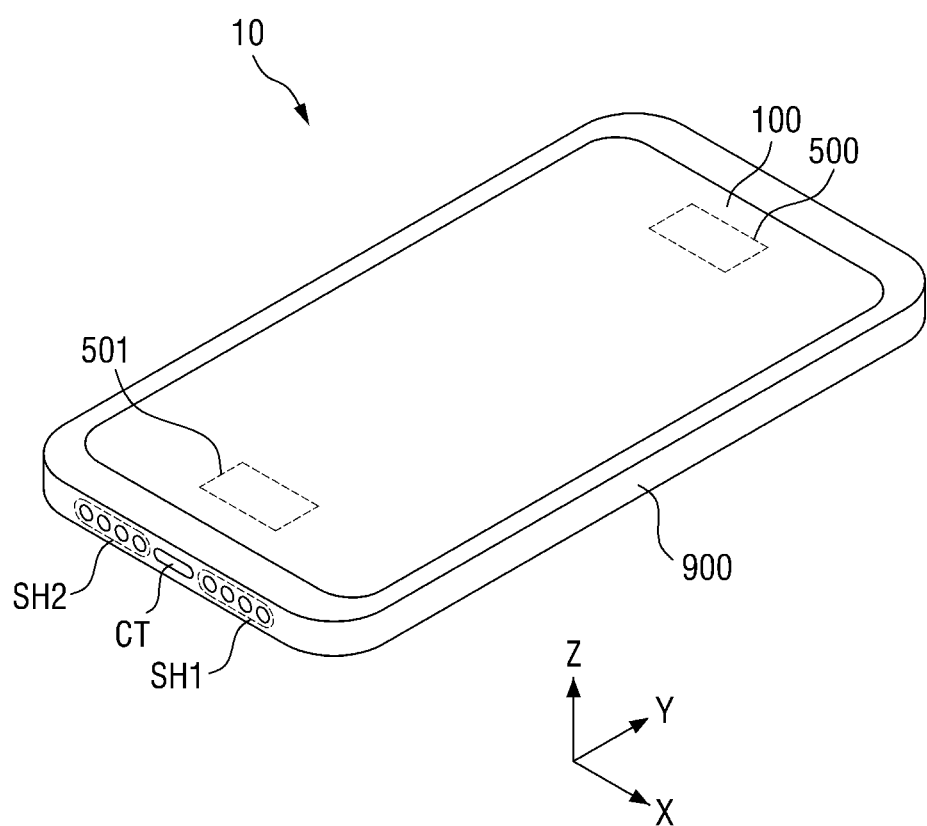
FIG. 19A is a perspective view of a display device constructed according to another exemplary embodiment of the present disclosure.
Figure 19B:
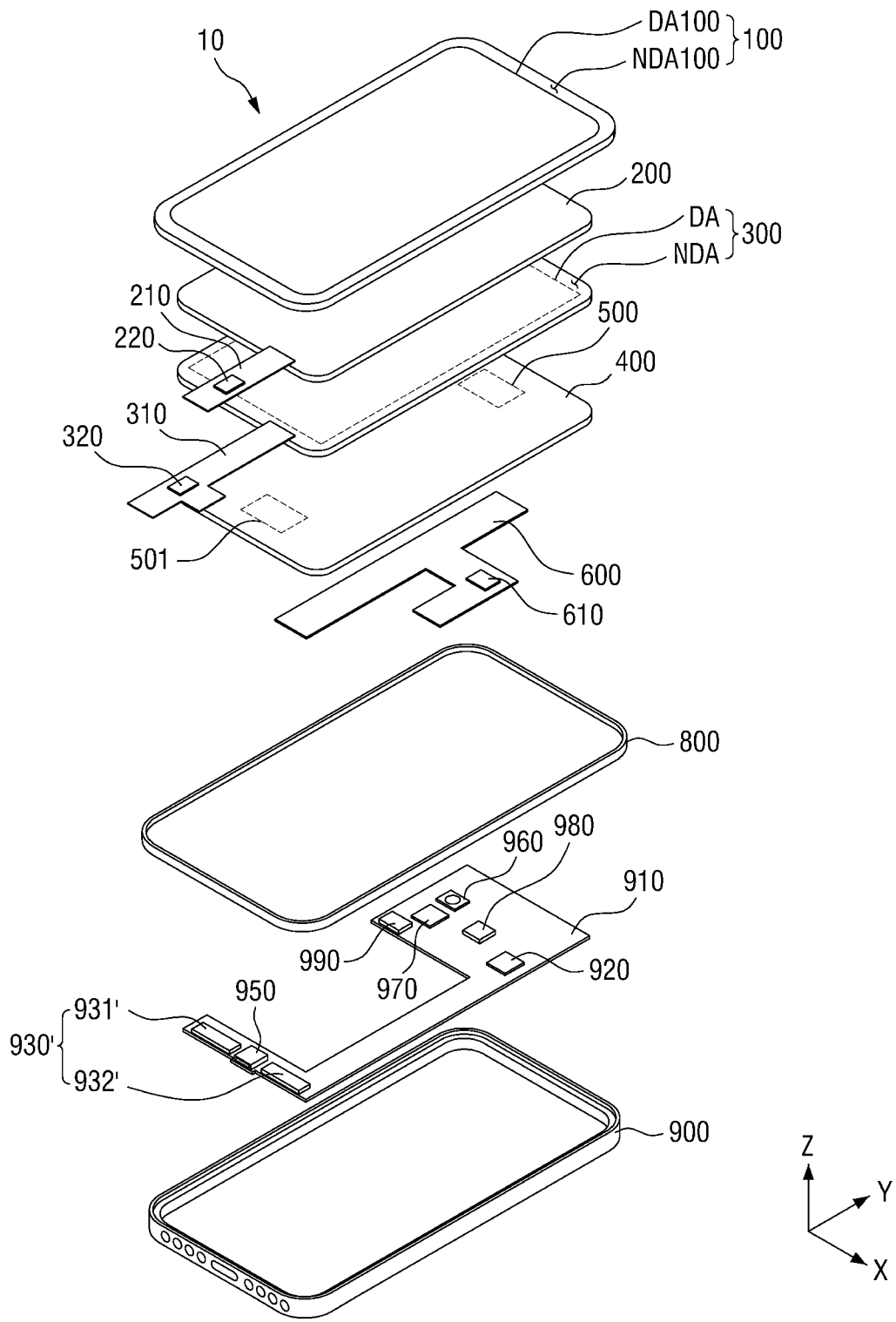
FIGS. 19B and 19C are exploded perspective views of the display device of FIG. 19A.
Figure 19C:
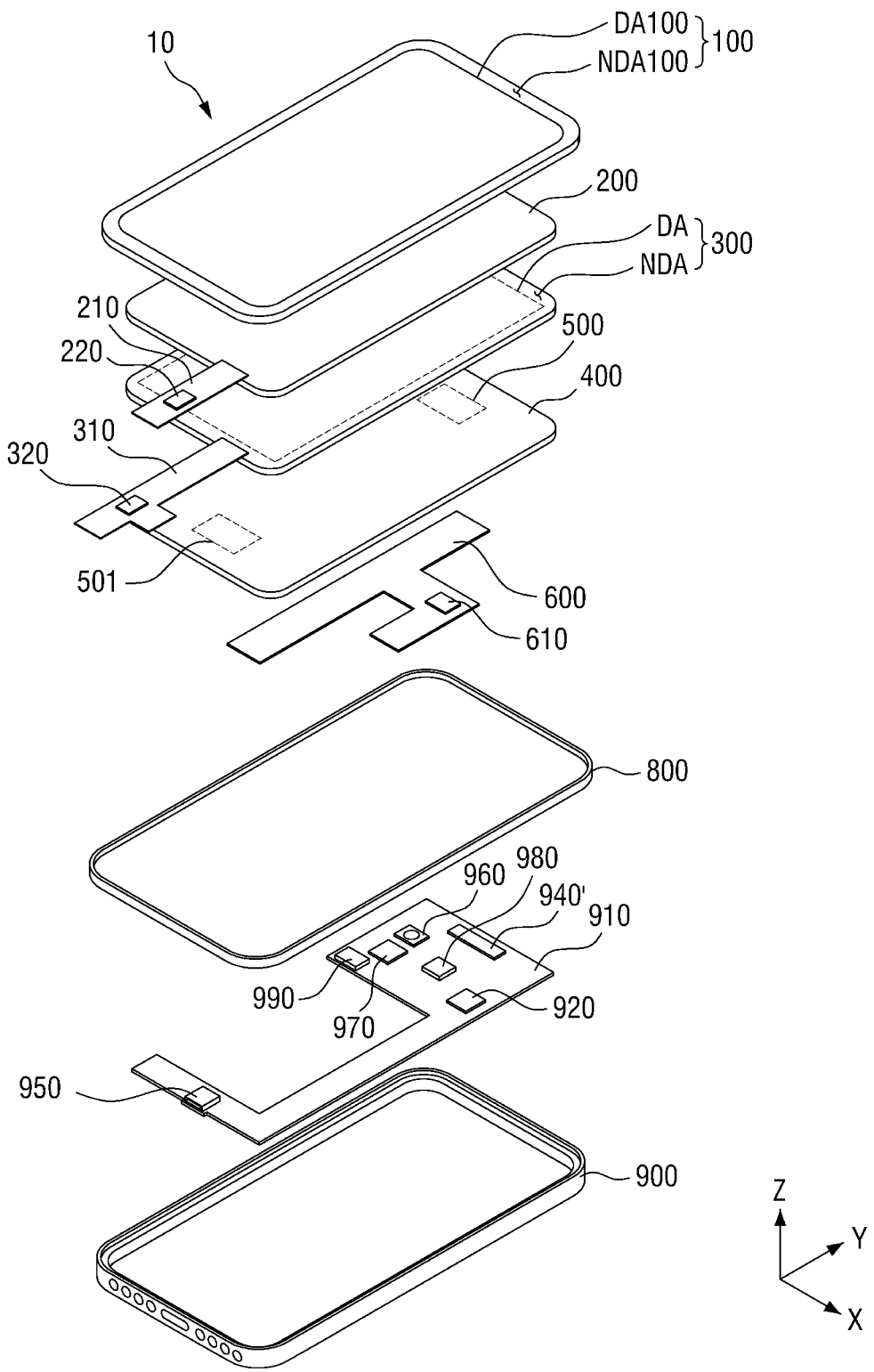

FIG. 19A is a perspective view of a display device according to another exemplary embodiment of the present disclosure. FIGS. 19B and 19C are exploded perspective views of the display device of FIG. 19A.

A display device 10 of FIGS. 19A, 19B, and 19C differs from the display device 10 of FIGS. 17A, 17B, and 17C in that a fourth sound generating device 970' is implemented as a vibration generating device mounted on a main circuit board 910. The display device 10 of FIGS. 19A, 19B, and 19C will hereinafter be described focusing mainly on the difference(s) with the display device 10 of FIGS. 17A, 17B, and 17C.

Referring to FIGS. 19A, 19B, and 19C, the fourth sound generating device 970' may be mounted on the main circuit board 910. The fourth sound generating device 970' may be a vibration generating device such as an ERM, an LRA, or a piezoelectric actuator.

The fourth sound generating device 970' may include a DSP processing fourth sound data from a main processor 920, a DAC converting the fourth sound data into a fourth sound signal, which is an analog signal, an amplifier amplifying and outputting the fourth sound signal, and a vibration generator generating vibration in accordance with the fourth sound signal. Also, the fourth sound generating device 970' may receive the fourth sound signal directly from the main processor 920, in which case, the fourth sound generating device 970' may include only the vibration generator. The fourth sound generating device 970' may vibrate in accordance with the fourth sound signal and may thus provide fourth sound.

The fourth sound generating device 970' not only provides the fourth sound, but is also generates various patterns of vibration so as for a user who uses the display device 10 to receive various haptic feedback.

Figure 20:
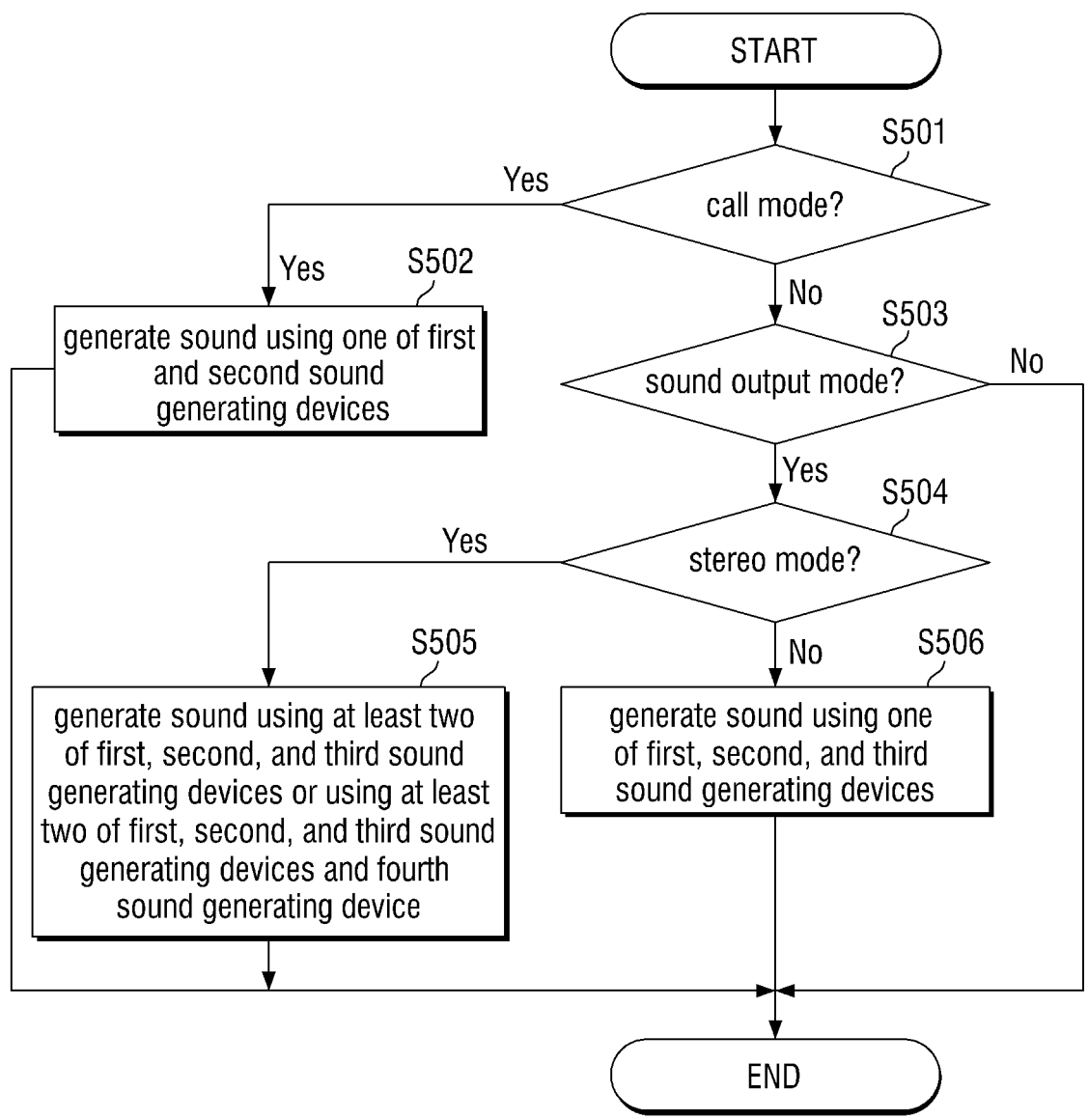
FIG. 20 is a flowchart illustrating a method of driving a display device constructed according to another exemplary embodiment of the present disclosure.

FIG. 20 is a flowchart illustrating a method of driving a display device according to another exemplary embodiment of the present disclosure. FIGS. 21A, 21B, 21C, and 21D are graphs showing the SPLs vs frequency of the first, third, and fourth sound generating devices of the display device of FIGS. 19A, 19B, and 19C, and the assembly of the first, third, and fourth sound generating devices, respectively. FIGS. 22A, 22B, 22C, 22D, and 22E are graphs showing the SPLs vs frequency of the first, second, third, and fourth sound generating devices of the display device of FIGS. 19A, 19B, and 19C, and the assembly of the first, second, third, and fourth sound generating devices of the display device of FIGS. 19A, 19B, and 19C, respectively.

An exemplary sound output method of the display device 10 of FIGS. 19A, 19B, and 19C, which includes first, second, and third sound generating devices 500, 501, and 930' or 940' and the fourth sound generating device 970', will hereinafter be described with reference to FIG. 20.

S501 and S502 of FIG. 20 are substantially the same as S201 and S202, respectively, of FIG. 13. Also, S501 and S502 of FIG. 20 may be replaced with S301 through S304 of FIG. 15. Accordingly, detailed descriptions of S501 and S502 of FIG. 20 will be omitted.

Referring to FIG. 20, the main processor 920 determines whether the display device 10 is being driven in the sound output mode (S503).

Thereafter, in response to a determination being made that the display device 10 is being driven in the sound output mode, the main processor 920 determines whether the display device 10 is being driven in the stereo mode or the mono mode (S504).

Thereafter, in response to a determination being made that the display device 10 is being driven in the stereo mode, the main processor 920 controls sound to be generated and output via at least two of the first, second, and third sound generating devices 500, 501, and 930' or 940' or via at least two of the first, second, and third sound generating devices 500, 501, and 930' or 940' and the fourth sound generating device 970' (S505).

For example, the main processor 920 may control the first and second sound generating devices 500 and 501 to generate first and second sounds and may thus provide stereo sound of 2 channels to the user. Specifically, the main processor 920 outputs first sound data and second sound data to a sound driving circuit 610 via the main circuit board 910, a display circuit board 310, and a sound circuit board 600. The sound driving circuit 610 generates first and second sound signals based on the first and second sound data, respectively, and outputs the first and second sound signals to the first and second sound generating devices 500 and 501, respectively. The first sound generating device 500 may output first sound in accordance with the first sound signal. The second sound generating device 501 may output second sound in accordance with the second sound signal.

Also, the main processor 920 may control the first and third sound generating devices 500 and 930' or 940' to generate first and third sounds and may thus provide stereo sound of 2 channels to the user. Specifically, the main processor 920 may output first sound data to the sound driving circuit 610 via the main circuit board 910, the display circuit board 310, and the sound circuit board 600 and may output third sound data or a third sound signal to the third sound generating device 930' or 940'. The sound driving circuit 610 generates a first sound signal based on the first sound data and outputs the first sound signal to the first sound generating device 500. The first sound generating device 500 may output first sound in accordance with the first sound signal. The third sound generating device 930' or 940' may output third sound in accordance with a third sound signal generated based on the third sound data or the third sound signal output by the main processor 920.

Also, the main processor 920 may control the second and third sound generating devices 501 and 930' or 940' to generate second and third sounds and may thus provide stereo sound of 2 channels to the user. Specifically, the main processor 920 may output second sound data to the sound driving circuit 610 via the main circuit board 910, the display circuit board 310, and the sound circuit board 600 and may output third sound data or a third sound signal to the third sound generating device 930' or 940'. The sound driving circuit 610 generates a second sound signal based on the second sound data and outputs the second sound signal to the second sound generating device 501. The second sound generating device 501 may output second sound in accordance with the second sound signal. The third sound generating device 930' or 940' may output third sound in accordance with a third sound signal generated based on the third sound data or the third sound signal output by the main processor 920.

Also, the main processor 920 may control at least two of the first, second, and third sound generating devices 500, 501, and 930' or 940' and the fourth sound generating device 970' to generate at least two of first, second, and third sounds and fourth sound and may thus provide stereo sound of 2.1 channels to the user. In this case, the fourth sound generating device 970' may serve as a woofer for outputting low sound. Specifically, the main processor 920 may output fourth sound data or a fourth sound signal to the fourth sound generating device 970', and the fourth sound generating device 970' may output fourth sound in accordance with a fourth sound signal generated based on the fourth sound data or the fourth sound signal output by the main processor 920.

Figure 21A:
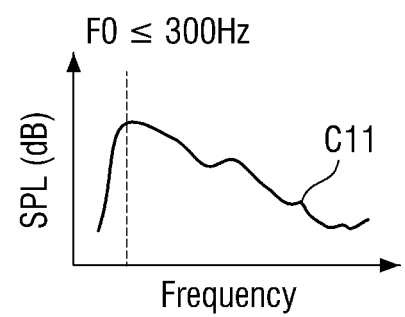
FIGS. 21A, 21B, 21C, and 21D are graphs showing the SPLs vs frequency of the first, third, and fourth sound generating devices of the display device of FIGS. 19A, 19B, and 19C, and the assembly of the first, third, and fourth sound generating devices, respectively.
Figure 21B:
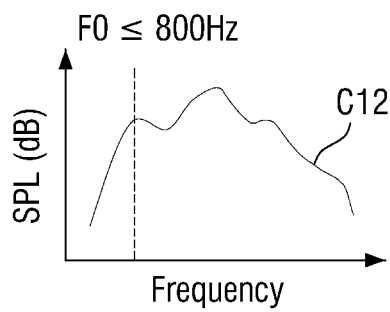
Figure 21C:
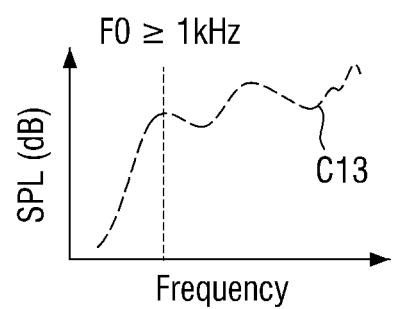
Figure 21D:
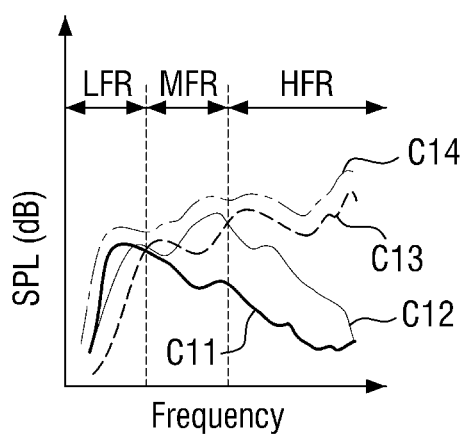

Particularly, in a case where the fundamental frequency F0 of the first sound generating device 500 is controlled in the same manner as the fundamental frequency F0 of the second sound generating device 501, as indicated by a curve C13 of FIG. 21C and the fundamental frequency F0 of the first or second sound generating device 500 or 501, the fundamental frequency F0 of the third sound generating device 930' or 940', and the fundamental frequency F0 of the fourth sound generating device 970' are controlled differently from one another, as indicated by curves C11, C12, and C13 of FIGS. 21A, 21B, and 21C, the frequency band of sound to be provided to the user can be expanded, as indicated by a curve C14 of FIG. 21D, and richer sound can be provided to the user. Referring to FIGS. 21A, 21B, 21C, and 21D, the X axis represents resonant frequency, the Y axis represents SPL, and F0 denotes the minimum frequency at which the displacement of the diaphragm of each sound generating device becomes greater than a reference displacement.

Specifically, the fourth sound generating device 970' may output fourth sound having a fundamental frequency F0 of 300 MHz or lower, as illustrated in FIG. 21A, the third sound generating device 930' or 940' may output third sound having a fundamental frequency F0 of 800 MHz or lower, as illustrated in FIG. 21B, and the first and second sound generating devices 500 and 501 may output first and second sounds having a fundamental frequency F0 of 1 KHz or higher, as illustrated in FIG. 21C. In this case, the fourth sound has a higher SPL than the first, second, and third sounds in a low frequency band LFR, the first and second sounds have a higher SPL than the third and fourth sounds in a high frequency band HFR, and the third sound has a higher SPL than the first, second, and fourth sounds in a medium frequency band MFR between the low frequency band LFR and the high frequency band HFR. Accordingly, in the case of providing sound to the user using one of the first and second sound generating devices 500 and 501 and using the third and fourth sound generating device 930' or 940' and 970', SPL can be enhanced in all the low frequency band LFR and the high frequency band HFR, as illustrated in FIG. 21D. That is, the display device 10 can expand the frequency band of sound to be provided to the user and can thus provide richer sound.

Figure 22A:
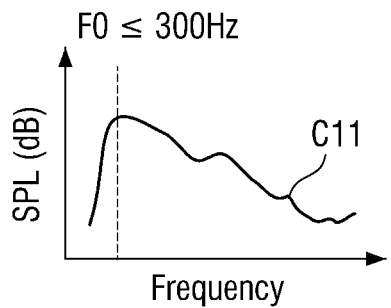
FIGS. 22A, 22B, 22C, 22D, and 22E are graphs showing the SPLs vs frequency of the first, second, third, and fourth sound generating devices of the display device of FIGS. 19A, 19B, and 19C, and the assembly of the first, second, third, and fourth sound generating devices of the display device of FIGS. 19A, 19B, and 19C, respectively.
Figure 22B:
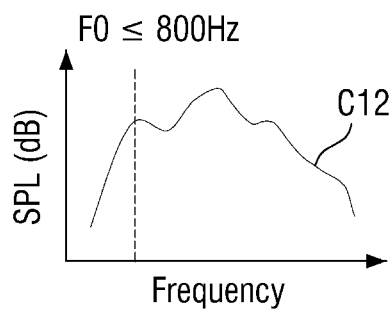
Figure 22C:
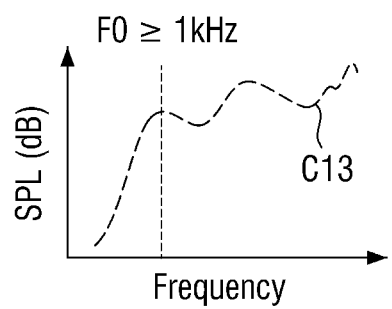
Figure 22D:
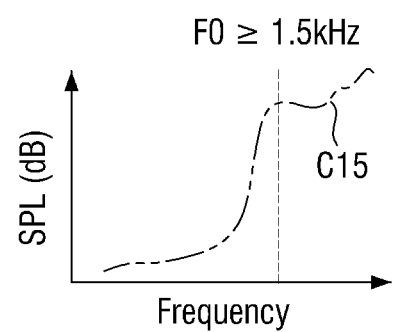
Figure 22E:
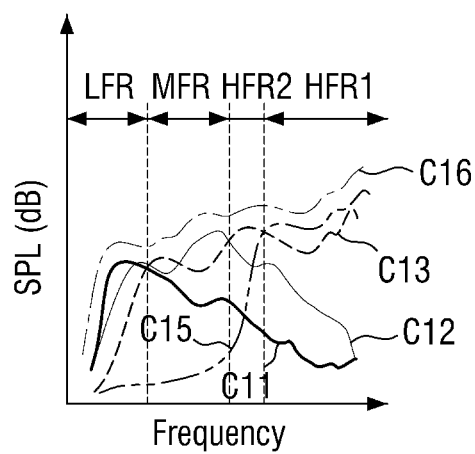

Also, in a case where the fundamental frequencies F0 of the first, second, third, and fourth sound generating devices 500, 501, 930' or 940', and 970' are all controlled differently from one another, as illustrated in FIGS. 22A, 22B, 22C, and 22D, the frequency band of sound to be provided to the user can be expanded, as illustrated in FIG. 22E, and richer sound can be provided to the user. Referring to FIGS. 22A, 22B, 22C, and 22D, F0 denotes the minimum frequency at which the displacement of the diaphragm of each sound generating device becomes greater than a reference displacement.

Specifically, the fourth sound generating device 970' may output fourth sound having a fundamental frequency F0 of 300 MHz or lower, as indicated by a curve C11 of FIG. 22A, the third sound generating device 930' or 940' may output third sound having a fundamental frequency F0 of 800 MHz or lower, as indicated by a curve C12 of FIG. 22B, the second sound generating device 501 may output second sound having a fundamental frequency F0 of 1 KHz or higher, as indicated by a curve C13 of FIG. 22C, and the first sound generating device 500 may output first sound having a fundamental frequency F0 of 1.5 KHz or higher, as indicated by a curve C15 of FIG. 22D. In this case, the fourth sound has a higher SPL than the first, second, and third sounds in a low frequency band LFR, the third sound has a higher SPL than the first, second, and fourth sounds in a medium frequency band MFR between the low frequency band LFR and a second high frequency band HFR2, the second sound has a higher SPL than the first, third, and fourth sounds in the second high frequency band HFR2, which is between the medium frequency band MFR and a first high frequency band HFR1, and the first sound has a higher SPL than the second, third, and fourth sounds in the first high frequency band HFR1. Accordingly, in the case of providing sound to the user using all the first, second, third, and fourth sound generating devices 500, 501, 930' or 940', and 970', SPL can be enhanced in all the low frequency band LFR, the medium frequency band MFR, and the first and second high frequency bands HFR1 and HFR2, as illustrated in FIG. 22E. That is, the display device 10 can expand the frequency band of sound to be provided to the user and can thus provide richer sound.

Stereo sound of 2 or more channels can be provided using one of the first, second, and third sound generating devices 500, 501, and 930' or 940' and using the fourth sound generating device 970'. Since the fundamental frequency F0 of the fourth sound generating device 970' is lower than 300 MHz, the fourth sound generating device 970' may be suitable for use as a woofer for outputting low sound. Accordingly, when the fourth sound generating device 970' is used, stereo sound of 2.1 channels, rather than stereo sound of 2 channels, may preferably be provided to the user.

Referring again to FIG. 20, in response to a determination being made that the display device 10 is being driven in the mono mode, the main processor 920 may control one of the first, second, and third sound generating devices 500, 501, and 930' or 940' to generate and output sound (S506).

For example, the main processor 920 may control only the first sound generating device 500 to generate first sound. Specifically, the main processor 920 may output first sound data to the sound driving circuit 610 via the main circuit board 910, the display circuit board 310, and the sound circuit board 600. The sound driving circuit 610 generates a first sound signal based on the first sound data and outputs the first sound signal to the first sound generating device 500. The first sound generating device 500 may output first sound in accordance with the first sound signal.

In another example, the main processor 920 may control only the second sound generating device 501 to generate second sound. Specifically, the main processor 920 may output second sound data to the sound driving circuit 610 via the main circuit board 910, the display circuit board 310, and the sound circuit board 600. The sound driving circuit 610 generates a second sound signal based on the second sound data and outputs the second sound signal to the second sound generating device 501. The second sound generating device 501 may output second sound in accordance with the second sound signal.

In another example, the main processor 920 may control only the third sound generating device 930' or 940' to generate third sound. Specifically, the main processor 920 may output third sound data or a third sound signal to the third sound generating device 930' or 940'. The third sound generating device 930' or 940' may output third sound in accordance with a third sound signal generated based on the third sound data or the third sound signal output by the main processor 920.

The mono mode can also be realized using the fourth sound generating device 970'. However, since the fundamental frequency F0 of the fourth sound generating device 970' is lower than 300 MHz, the fourth sound generating device 970' may be suitable for use as a woofer for outputting low sound. Accordingly, when the fourth sound generating device 970' is used, stereo sound of 2.1 channels in the stereo mode, rather than mono sound, may preferably be provided to the user.

According to the exemplary embodiment of FIG. 20, since in the mono mode, the display device 10 can output sound using one of the first, second, and third sound generating devices 500, 501, and 930' or 940', the power consumption of the display device 10 can be reduced in the mono mode than in the stereo mode.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display panel configured to display an image on a first surface thereof;
   a first sound generating device configured to provide a first sound;
   a second sound generating device configured to provide a second sound,
   a display circuit board connected to the display panel, and
   a main circuit board electrically connected to the display circuit board,
   wherein the second sound generating device is disposed on the main circuit board,
   wherein the first sound generating device is attached to a second surface of the display panel, the second surface being opposite to the first surface,
   wherein the first sound generating device is a vibration generating device configured to vibrate the display panel in accordance with a first sound signal to generate the first sound,
   wherein the display panel is an organic light-emitting diode (OLED) display panel using OLEDs,
   wherein the first sound generating device includes a vibration layer, which is a piezoelectric actuator, and
   wherein the second sound generating device is a speaker.

2. The display device of claim 1, wherein a sound pressure level of the first sound in a high frequency band is higher than a sound pressure level of the second sound in the high frequency band,
   wherein the sound pressure level of the second sound in a low frequency band is higher that the sound pressure level of the first sound in the low frequency band, and
   wherein the high frequency band is higher than the low frequency band.

3. The display device of claim 1, wherein the second sound generating device is configured to provide the second sound in accordance with a second sound signal.

4. The display device of claim 3, further comprising:
   a third sound generating device configured to provide a third sound in accordance with a third sound signal,
   wherein a third generating device is a speaker.

5. The display device of claim 4, wherein a sound pressure level of the first sound in a high frequency band is higher than a sound pressure level of the third sound in the high frequency band,
   wherein the sound pressure level of the third sound in a low frequency band is higher than the sound pressure level of the first sound in the low frequency band, and
   wherein the high frequency band is higher than the low frequency band.

6. The display device of claim 4, wherein the third sound generating devices is disposed on the main circuit board disposed on the second surface of the display panel.

7. The display device of claim 6, wherein the second sound generating device is disposed on one side of the main circuit board, and
   wherein the third sound generating device is disposed on the other side of the main circuit board.

8. The display device of claim 4, wherein the first sound generating device is configured to provide the first sound in response to the display device being driven in a call mode,
   wherein at least two of the first, second, and third sound generating devices are configured to provide sound in response to the display device being driven in a stereo mode, and
   wherein one of the first, second, and third sound generating devices is configured to provide sound in response to the display device being driven in a mono mode.

9. A display device comprising:
   a display panel configured to display an image on a first surface thereof;
   a first sound generating device attached to a second surface of the display panel, and configured to vibrate the display panel in accordance with a first sound signal to generate a first sound;
   a second sound generating device attached to the second surface of the display panel, and,
   configured to vibrate the display panel in accordance with a second sound signal for generating a second sound,
   a third sound generating device configured to provide a third sound in accordance with a third sound signal; and
   a circuit board on which the second sound generating device is disposed,
   wherein a high frequency band, a sound pressure level of the first sound is higher than a sound pressure level of the second sound and a sound pressure level of the second sound,
   wherein a low frequency band, the sound pressure level of the second sound is higher that the sound pressure level of the first sound and the sound pressure level of the third sound,
   wherein the medium frequency band, the sound pressure level of the third sound is higher that the sound pressure level of the first sound and the sound pressure level of the first sound,
   wherein the medium frequency band is between the high frequency band and the low frequency band,
   wherein the display panel is an organic light-emitting diode (OLED) display using OLED,
   wherein the first sound generating device includes a vibration layer, which is a piezoelectric actuator, and
   wherein the second generating device and the third sound generating device are speakers.

10. The display device of claim 9, wherein a sound pressure level of the first sound in a high frequency band is higher than a sound pressure level of the third sound in the high frequency band,
    wherein the sound pressure level of the third sound in a low frequency band is higher than the sound pressure level of the first sound in the low frequency band,
    wherein a sound pressure level of the second sound in the high frequency band is higher than the sound pressure level of the third sound in the high frequency band, wherein the sound pressure level of the third sound in the low frequency band is higher than the sound pressure level of the second sound in the low frequency band, and wherein the high frequency band is higher than the low frequency band.

11. The display device of claim 9, wherein the third sound generating device is disposed on the circuit board disposed on the second surface of the display panel.

12. The display device of claim 9, wherein the third sound generating device is configured to provide the third sound signal as a haptic signal for providing various haptic feedback to a user.

13. The display device of claim 9, wherein one of the first sound generating device and second sound generating device is configured to provide sound in response to the display device being driven in a call mode, wherein the first and second sound generating devices, or the first, second, and third sound generating devices are configured to provide sound in response to the display device being driven in a stereo mode, and wherein one of the first and second sound generating devices is configured to provide sound in response to the display device being driven in a mono mode.

14. The display device of claim 9, wherein the first sound generating device is disposed on one side of the second surface of the display panel, and wherein the second sound generating device is disposed on the other side of the second surface of the display panel.

15. The display device of claim 14, wherein, in response to the display device being driven in a call mode, one of the first sound generating device and the second sound generating device that is disposed closer to an ear of a user than the other is configured to provide sound.

16. The display device of claim 14, wherein, in response to the display device being driven in a call mode, one of the first sound generating device and the second sound generating device that is disposed higher than the other on the second surface of the display panel, and wherein the high frequency band is higher than the low frequency band.

17. The display device of claim 9, wherein the third sound generating device is a speaker device.

18. The display device of claim 9, further comprising:

a fourth sound generating device configured to provide a fourth sound in accordance with a fourth sound signal, the fourth sound generating device being a vibration generating device, wherein the fourth sound generating device is a coil surrounding a magnet.

19. The display device of claim 18, wherein the third and fourth sound generating devices are disposed on the circuit board disposed on the second surface of the display panel.

20. The display device of claim 18, wherein the fourth sound generating device is configured to provide the fourth sound signal as a haptic signal for providing various haptic feedback to a user.

21. The display device of claim 18, wherein a sound pressure level of the fourth sound in a low frequency band is higher than sound pressure level of the first, second, and third sounds in the low frequency band, wherein the sound pressure level of the third sound in a medium frequency band is higher than sound pressure level of the first, second, and fourth sounds in the medium frequency band, the medium frequency band being higher than the low frequency band, wherein the sound pressure level of the first or second sound in a high frequency band is higher than sound pressure level of the third or fourth sound in the high frequency band, the high frequency band being higher than the medium frequency band, and wherein the medium frequency band is between the high frequency band and the low frequency band.

22. The display device of claim 18, wherein a sound pressure level of the fourth sound in a low frequency band is higher than sound pressure level of the first, second, and third sounds in the low frequency band, wherein the sound pressure level of the third sound in a medium frequency band is higher than sound pressure level of the first, second, and fourth sounds in the medium frequency band, the medium frequency band being higher than the low frequency band, wherein the sound pressure level of the second sound in a second high frequency band is higher than sound pressure level of the first, third, and fourth sounds in the second high frequency band, the second high frequency band being higher than the medium frequency band, wherein the sound pressure level of the first sound in a first high frequency band is higher than sound pressure level of the second, third, and fourth sounds in the first high frequency band, the first high frequency band being higher than the second high frequency band, and wherein the medium frequency band is between the second high frequency band and the low frequency band, and the second high frequency band is between the first high frequency band and the medium frequency band.

23. The display device of claim 18, wherein one of the first and second sound generating devices is configured to provide sound in response to the display device being driven in a call mode, wherein at least two of the first, second, and third sound generating devices, or at least two of the first, second, and third sound generating devices and the fourth sound generating device are configured to provide sound in response to the display device being driven in a stereo mode, and wherein one of the first, second, and third sound generating devices is configured to provide sound in response to the display device being driven in a mono mode.

* * * * *